United States Patent
Sherman et al.

(10) Patent No.: US 6,355,759 B1
(45) Date of Patent: Mar. 12, 2002

(54) POLYDIORGANOSILOXANE POLYUREA SEGMENTED COPOLYMERS AND A PROCESS FOR MAKING SAME

(75) Inventors: Audrey A. Sherman, St. Paul, MN (US); Walter R. Romanko, Austin, TX (US); Mieczyslaw H. Mazurek, Roseville, MN (US); Kurt C. Melancon, White Bear Lake, MN (US); Constance J. Nelson; Jayshree Seth, both of Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 08/930,324

(22) PCT Filed: Apr. 25, 1996

(86) PCT No.: PCT/US96/05869

§ 371 Date: Sep. 26, 1997

§ 102(e) Date: Sep. 26, 1997

(87) PCT Pub. No.: WO96/34029

PCT Pub. Date: Oct. 31, 1996

(51) Int. Cl.$^7$ ............................................. C08G 77/24
(52) U.S. Cl. .............................. 528/28; 528/38; 528/42
(58) Field of Search ............................. 528/28, 38, 42

(56) References Cited

U.S. PATENT DOCUMENTS

| | | | |
|---|---|---|---|
| 2,676,182 A | 4/1954 | Daudt et al. | 260/448.2 |
| 2,736,721 A | 2/1956 | Dexter | 260/42 |
| 2,814,601 A | 11/1957 | Currie et al. | 260/29.1 |
| 2,857,356 A | 10/1958 | Goodwin, Jr. | 260/42 |
| 3,528,940 A | 9/1970 | Modic | 260/37 |
| 3,562,352 A | 2/1971 | Nyilas | 260/824 |
| 3,772,247 A | 11/1973 | Flannigan | 260/46.5 |
| 3,890,269 A | 6/1975 | Martin | 260/46.5 |
| 4,117,192 A | 9/1978 | Jorgensen | 428/337 |
| 4,447,493 A | 5/1984 | Driscoll et al. | 428/332 |
| 4,518,758 A | 5/1985 | Cavezzan et al. | 528/12 |
| 4,528,343 A | 7/1985 | Kira | 528/26 |
| 4,539,345 A | 9/1985 | Hansen | 523/219 |
| 4,605,712 A | 8/1986 | Mueller et al. | 525/474 |
| 4,736,048 A | 4/1988 | Brown et al. | 556/454 |
| 4,900,474 A | 2/1990 | Terae et al. | 252/358 |
| 4,908,208 A | 3/1990 | Lee et al. | 424/409 |
| 4,933,396 A | 6/1990 | Leir et al. | 525/410 |
| 4,948,859 A | 8/1990 | Echols et al. | 528/28 |
| 4,985,526 A | 1/1991 | Kishita et al. | 528/15 |
| 5,028,679 A | 7/1991 | Terae et al. | 528/12 |
| 5,091,483 A | 2/1992 | Mazurek et al. | 525/477 |
| 5,118,775 A | 6/1992 | Inomata et al. | 528/12 |
| 5,194,113 A | 3/1993 | Lasch et al. | 156/243 |
| 5,213,879 A | 5/1993 | Niwa et al. | 428/213 |
| 5,214,119 A * | 5/1993 | Leir et al. | 528/28 |
| 5,236,997 A | 8/1993 | Fujiki | 524/731 |
| 5,268,433 A | 12/1993 | Ikeno et al. | 525/478 |
| 5,279,896 A | 1/1994 | Tokunaga et al. | 428/355 |
| 5,286,815 A | 2/1994 | Leir et al. | 525/477 |
| 5,290,615 A | 3/1994 | Tushaus et al. | 428/40 |
| 5,314,748 A | 5/1994 | Mazurek et al. | 428/345 |
| 5,391,015 A | 2/1995 | Kaczmarczik et al. | 404/14 |
| 5,461,134 A | 10/1995 | Leir et al. | 528/14 |
| 5,468,815 A | 11/1995 | Boardman et al. | 525/478 |
| 5,670,598 A * | 9/1997 | Leir et al. | 528/28 |

FOREIGN PATENT DOCUMENTS

| | | | |
|---|---|---|---|
| DE | 3143994 | 5/1983 | B29D/7/02 |
| EP | 0 250 248 | 12/1987 | C08G/77/54 |
| EP | 0 311 262 | 4/1989 | C08L/83/08 |
| EP | 0 540 332 | 5/1993 | F16F/9/30 |
| EP | 0 737 700 A2 | 10/1996 | |
| EP | 0 737 700 A3 | 12/1996 | |
| JP | 4-214341 | 8/1992 | B32B/27/00 |
| WO | WO 95/03354 | 2/1995 | C08G/77/26 |

OTHER PUBLICATIONS

Parin, "Constrained Layer Viscoelastic Vibration Damping," Techical Paper, *Society of Manufacturing Engineers*, (1989).
Yilgor et al., "Segmented Organosiloxane Copolymers—1. Synthesis of Siloxane—Urea Copolymers," *Polymer*, vol. 25, pp. 1800–1806 (Dec. 1984).
Tyagi et al., "Segmented Organosiloxane Copolymers—2. Thermal and Mechanical Properties of Siloxane—Urea Copolymers," *Polymer*, vol. 25, pp. 1807–1816 (Dec. 1984).
Tyagi et al., "Solid State Properties of Segmented Polysiloxane Thermoplastic Elastomeric Copolymers," *Polymer Preprints*, vol. 24, No. 2, pp. 39–40 (Aug. 1983).

* cited by examiner

*Primary Examiner*—Margaret G. Moore
(74) *Attorney, Agent, or Firm*—Carolyn V. Peters

(57) ABSTRACT

Melt-processable polydiorganosiloxane polyurea segmented copolymer compositions are provided. The compositions comprise alternating soft polydiorganosiloxane units and hard diisocyanate residue units, the diisocyanate residue being the diisocyanate minus the —NCO groups, the units being connected together by urea linkages which also provide hard units. The compositions are prepared by continuously providing at least one diisocyanate and at least one polydiorganosiloxane diamine to a reactor, mixing the diisocyanate and the polydiorganosiloxane diamine in the reactor under substantially solvent-free conditions, allowing the diisocyanate and polydiorganosiloxane diamine to react to form a polydiorganosiloxane polyurea copolymer, and conveying the copolymer from the reactor.

5 Claims, No Drawings

POLYDIORGANOSILOXANE POLYUREA SEGMENTED COPOLYMERS AND A PROCESS FOR MAKING SAME

FIELD OF THE INVENTION

This invention relates to polydioranosiloxane polyurea segmented copolymers and a process for making same.

BACKGROUND OF THE INVENTION

Polydiorganosiloxane polymers have unique properties derived mainly from the physical and chemical characteristics of the siloxane bond. Typically, the outstanding properties of polydiorganosiloxane polymers include resistance to ultraviolet light, extremely low glass transition temperature, good thermal and oxidative stability, good permeability to many gases, very low surface energy, low index of refraction, good hydropnobicity, and good dielectric properties. They also have very good biocompatibility and are of great interest as biomaterials which can be used in the body in the presence of blood. Polydiorganosiloxane elastomers have been widely used because of these many excellent properties. But, their limited tear resistance and poor resistance to low polarity solvents have made them unsuitable in many other applications.

Elastomers possess the ability to recover their initial shape from deformation produced by an imposed force. Traditional polydiorganosiloxanes show elastomeric behavior only when they are chemically or physically crosslinked. Even extremely high molecular weight polydiorganosiloxane gums (greater than 500,000 grams per mole) exhibit cold flow when uncrosslinked. Thus, to be useful in most commercial applications, traditional polydiorganosiloxanes must be further filled with up to 50 weight percent fillers such as finely divided high surface area silica, fumed silica, titanium dioxide, alumina, zirconia, pigment-grade oxides, carbon blacks graphite, metal powders, clays, calcium carbonates, silicates, aluminates, fibrous fillers, and hollow glass or plastic microspheres, depending on the desired properties, for example, to maintain their mechanical strength and reduce swelling in solvents. Since polydiorganosiloxanes do not lose their mechanical strength as abruptly as other organic materials at elevated temperatures, they find particular use in high temperature applications.

For many uses such as in insulated wire, rods, channels, tubing, and similar products, polydiorganosiloxane compounds are extruded in standard rubber extrusion equipment. The extruded material must immediately be heated to set the form. Usually, hot-air vulcanization at 300–450° C. or steam at 0.28–0.70 MPa (40–100 psi) for several minutes is needed. Final properties can be developed by oven curing or by continuous steam vulcanization.

Silicone based release coatings have been used commercially for some time, predominantly in such applications as release liners for adhesives. Generally, these materials are coated from solvent or a carrier and thermally crosslinked at high temperatures. Recently, silicone release technologies have been disclosed which include addition cure, cationic cure, and radiation cure systems as well as silicone-containing block copolymers which do not require curing. Some of these systems can be coated without solvent, e.g., by roll coating. Others can be coated from organic solvents or water. None of these systems are believed to be hot melt processable. Thus, there is still a need for a silicone-based release coating that is hot melt coatable while retaining the desirable release performance features of the previously mentioned materials.

Block copolymers have long been used to obtain desirable performance characteristics in various products such as elastomers, sealants, caulking compounds, and release coatings.

Physically crosslinked polydiorganosiloxane elastomers usually are segmented copolymers. The mechanical properties of an elastomer generally increase with the molecular weight of the polymer. The molecular weight often can be determined by inherent viscosity measurements. For some uncrosslinked systems, as the molecular weight increases, the polymer becomes less soluble and the inherent viscosity becomes more difficult to measure. The mechanical properties and inherent viscosities of the polydiorganosiloxane polymers can be substantially increased, while most of the desired polydiorganosiloxane properties are maintained, through controlled, solvent-based synthesis of AB, ABA, or $(AB)_n$ segmented polymers, with a soft polydiorganosiloxane component and a hard component of either a crystalline structure with a high melting point or an amorphous structure with a high glass transition temperature and include, for example, hard segments such as polystyrene, polyamide, polyurethane, polyimide, polyester, polycarbonate, polysulfone and epoxide.

Another class of polydiorganosiloxane segmented copolymers is polydiorganosiloxane polyurea segmented copolymers which may contain blocks other than polydiorganosiloxane or urea. These have some potential process economy advantages because their synthesis reaction is more rapid than those previously mentioned, requires no catalyst, and produces no by-products.

In producing polydiorganosiloxane polyurea segmented copolymers, monofunctional reaction impurities in the polydiorganosiloxane diamine precursor can prematurely terminate the chain extension reaction and limit the attainment of optimum molecular weight and tensile strength of the polymer. Because the early processes for making the polydiorganosiloxane diamines resulted in increasing levels of monofunctional impurities with increasing molecular weight, it was not possible to achieve elastomers having satisfactory mechanical properties for most elastomer or adhesive applications. More recently, processes have been developed which produce materials with low levels of impurities over a wide range of polydiorganosiloxane diamine molecular weights. With this chemistry, polydiorganosiloxane polyurea segmented copolymers have been obtained having inherent viscosities of over 0.8 g/dL measured at 30° C. (using a Canon-Fenske viscometer with chloroform solution at a concentration of 0.4 g/dL) through the use of chain extenders to increase the non-silicone content.

Solution polymerized polydiorganosiloxane polyurea elastomers which do not require a cure step have been described. However, because these compositions are made in solvent, they can have costly handling procedures.

Continuous melt polymerization processes are advantageous and have been used to make compositions such as polyurethane elastomers and acrylate pressure sensitive adhesives. A continuous melt polymerization process for producing polyetherimides, which can contain polydiorganosiloxane segments, has also been described. Recently polyurethane resins have been described which use polydiorganosiloxane urea segments to prevent blocking of film formed from the resin. However, levels of reactive polydiorganosiloxane in the compositions were small, for example, less than 15 weight percent, and potential incomplete incorporation of the polydiorganosiloxane into the backbone was not detrimental since easy release was the intent. Unincorporated polydiorganosiloxane oil can, however, act as a plasticizing agent in elastomers to reduce tensile strength or detackify and reduce shear properties of pressure-sensitive adhesives. This unincorporated oil can also bloom to the surface of an elastomer or adhesive and contaminate other surfaces with which it is in contact.

SUMMARY OF THE INVENTION

Briefly, in one aspect of the present invention melt-processable polydiorganosiloxane polyurea segmented copolymer compositions are provided wherein such compositions comprise alternating soft polydiorganosiloxane units, and hard polyisocyanate residue units, (wherein the polyisocyanate residue is the polyisocyanate minus the —NCO groups), and optionally, soft and/or hard organic polyamine units, and such that the residues of the amine and isocyanate units are connected together by urea linkages. Compositions of the present invention typically have inherent viscosities of at least 0.8 dL/g, or are essentially insoluble in common organic solvents such as, for example, chloroform, tetrahydrofuran, dimethyl formamide, toluene, isopropyl alcohol, and combinations thereof The present invention also provides polydiorganosiloxane polyurea segmented copolymer compositions comprising the reaction product of (a) at least one polyamine, wherein the polyamine comprises at least one polydiorganosiloxane diamine, or a mixture of at least one polydiorganosiloxane diamine and at least one organic polyamine, and (b) at least one polyisocyanate, wherein the mol ratio of isocyanate to polyamine is between 0.9:1 and 0.95:1 or between 1.05:1 and about 1.3:1.

The polydiorganosiloxane polyurea segmented copolymers of the invention can be represented by the repeating unit:

erably represented by the formula —$R^2(CH_2)_a$CH=$CH_2$ wherein $R^2$ is —$(CH_2)_b$— or —$(CH_2)_c$CH=CH— and a is 1, 2 or 3; b is 0, 3 or 6; and c is 3, 4 or 5, a cycloalkyl moiety having about 6 to 12 carbon atoms and may be substituted with alkyl, fluoroalkyl, and vinyl groups, or an aryl moiety preferably having about 6 to 20 carbon atoms and may be substituted with, for example, alkyl, cycloalkyl, fluoroalkyl and vinyl groups or R is a perfluoroalkyl group as described in U.S. Pat. No. 5,028,679, wherein such description is incorporated herein by reference, a fluorine-containing group, as described in U.S. Pat. No. 5,236,997, wherein such description is incorporated herein by reference, or a perfluoroether-containing group, as described in U.S. Pat. Nos. 4,900,474 and 5,118,775, wherein such descriptions are incorporated herein by reference; preferably at least 50% of the R moieties are methyl radicals with the balance being monovalent alkyl or substituted alkyl radicals having 1 to 12 carbon atoms, alkenylene radicals, phenyl radicals, or substituted phenyl radicals;

each Z is a polyvalent radical that is an arylene radical or an aralkylene radical preferably having from about 6 to 20 carbon atoms, an alkylene or cycloalkylene radical preferably having from about 6 to 20 carbon atoms, preferably Z is 2,6-tolylene, 4,4'-methylenediphenylene, 3,3'-dimethoxy-4,4'-biphenylene, tetramethyl-m-xylylene, 4,4'-methylenedicyclohexylene, 3,5,5-trimethyl-3-methylenecyclohexylene, 1,6-hexamethylene, 1,4-cyclohexylene, 2,2,4-trimethylhexylene and mixtures thereof;

each Y is a polyvalent radical that independently is an alkylene radical of 1 to 10 carbon atoms, an aralkylene radical or an arylene radical preferably having 6 to 20 carbon atoms;

each D is selected from the group consisting of hydrogen, an alkyl radical of 1 to 10 carbon atoms, phenyl, and a radical that completes a ring structure including B or Y to form a heterocycle;

B is a polyvalent radical selected from the group consisting of alkylene, aralkylene, cycloalkylene, phenylene, polyalkylene oxide, including for example, polyethylene oxide, polypropylene oxide, polytetramcthylene oxide, and copolymers and mixtures thereof;

m is a number that is 0 to about 1000;

n is a number that is equal to or greater than 1; and p is a number that is about 10 or larger, preferably about 15 to 2000, more preferably about 30 to 1500.

In the use of polyisocyanates (Z is a radical of functionality greater than 2) and polyamines (B is a radical of

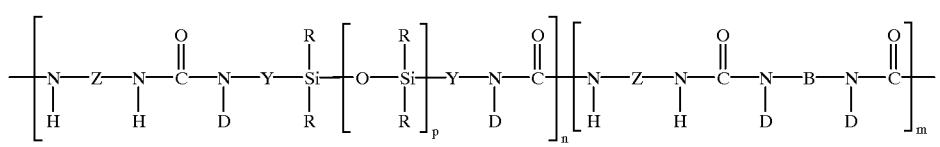

(I)

wherein:

each R is a moiety that independently is an alkyl moiety preferably having about 1 to 12 carbon atoms and may be substituted with, for example, trifluroalkyl or vinyl groups, a vinyl radical or higher alkenyl radical preffunctionality greater than 2), the structure of Formula I will be modified to reflect branching at the polymer backbone.

Polymers of the present invention typically have an inherent viscosity of at least about 0.8 dUg or are essentially insoluble in common organic solvents.

The compositions of the invention may further comprise fillers, tackifying agents, resins, pigments, stabilizers, plasticizers, and the like.

The polydiorganosiloxane polyurea segmented copolymers of the present invention have good mechanical properties even when unfilled and exhibit excellent physical properties typically associated with polysiloxanes, such as low glass transition temperature, transparency moderate resistance to ultraviolet light, low surface energy and hydrophobicity, good dielectric properties, and high permneability to many gases. Additionally, the polydiorganosiloxane polyurea segmented copolymers of the invention have moderate thermal and oxidative stabilities, have higher inherent viscosities than were previously obtainable, and are amenable to melt processing after polymerization. Further, some of the polydiorganosiloxane polyurea segmented copolymers of the invention are more resistant to swelling and degradation by hydrocarbon solvents than those previously obtainable. Also, some of the polydiorganosiloxane polyurea segmented copolymers of the invention are elastomeric materials that exhibit surprisingly low melt flow viscosities, and abrupt solidification at a temperature below melt flow conditions. In addition, some polydiorganosiloxane polyurea segmented copolymers of the present invention have an enhanced range of ultimate properties due to the expanded compositions available when organic polyamines are used with the polydiorganosiloxane diamines and polyisocyanates. These compositions vary over a wide range of choices and percentage incorporation for these reactants and afford polydiorganosiloxane polyurea segmented copolymers with tailorable properties, Such properties can include peel release levels, printability, tensile and tear strengths, moisture vapor transmission rates, as well as molecular structures and compositions not hereto available via solvent-based synthetic techniques.

In another aspect, the present invention provides a process for making the polydiorganosiloxane polyurea segmented copolymers comprising the steps of (a) continuously providing reactants to a reactor, wherein the reactants comprise at least one polyisocyanate and at least one polyamine, wherein the polyamine is at least one polydiorganosiloxane diamine or a mixture of at least one polydiorganosiloxane diamine and at least one organic polyamine, (b) mixing the reactants in the reactor, (c) allowing the reactants to react to form a polydiorganosiloxane polyurea copolymer, and (d) conveying the polymer from the reactor.

Preferred polyisocyanates useful in the process of the present invention can be represented by the formula:

OCN—Z—NCO        (II)

wherein Z is defined as above.

Polydiorganosiloxane diarines useful in the process of the present invention can be represented by the formula

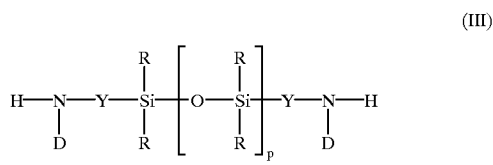

(III)

wherein each of R, Y, D, and p are defined as above.

Generally, the number average molecular weight of the polydiorganosiloxane diamines useful in the present invention are greater than about 700.

The process is substantially solventless. Generally, no solvent is needed to carry out the reaction, making the process more environmentally friendly than previous processes for making polydiorganosiloxane polyurea segmented copolymers as well as providing unique properties to many of the polydiorgano-siloxane polyurea segmented copolymers. Small amounts of solvent may be present, if necessary, to control the flow of solid isocyanates, high viscosity diisocyanates, or low amounts of diisocyanates, or for controlled addition of adjuvants such as tackifying resins, pigments, crosslinking agents, plasticizers fillers, and stabilizing agents, or to reduce their viscosity.

Advantageously, the essentially solventless and continuous process enables optimization of the properties of final materials by adjusting the isocyanate to amine ratio below and, surprisingly, well above 1:1. Unexpectedly, strong, extrudable materials are obtained, some of which have uniquely superior mechanical and Theological properties over those obtainable by conventional solvent polymerization processes. An additional benefit of the continuous, essentially solventless process of the present invention is the ability to extrude the polydiorganosiloxane polyurea segmented copolymer into a variety of shapes such as, for example, films, fibers, pellets, sheets, slabs, and tubing, directly after polymerization. This minimizes the heat and shear history of the polymer which can reduce performance characteristics due to possible degradation of the polymer.

Generally, the inherent viscosity of the resultant polydiorganosiloxane polyurea segmented copolymers increases with increasing polydiorganosiloxane diamine molecular weight. The inherent viscosities of the copolymers can be altered by the selection of the appropriate isocyanate to amine ratios and process conditions. Polydiorganosiloxane polyurea segmented copolymers having inherent viscosities greater than can be produced using conventional solution polymerization processes are achievable.

Using the process of the present invention, molecular weights can be achieved such that the copolymer is essentially insoluble in common organic Using the process of the present invention, molecular weights can be achieved such that the copolymer is essentially insoluble in common organic solvents. Further the process of the present invention, being a continuous bulk polymerization process, provides the ability to make high molecular weight compositions which are not obtainable by conventional solution polymerization due to the high viscosity or gel formation of the forming polymer in the solvent medium.

DESCRIPTION OF THE PREFERRED EMBODIMENT(S)

Polydiorganosiloxane diamines useful in the present invention are any that fall within Formula III above and include those having number average molecular weights in the range of about 700 to 150,000, more preferably greater than 1600. Preferred silicone diamines are substantially pure polydiorganosiloxane diamines prepared as described in U.S. Pat. No. 5,214,119 wherein such description is incorporated herein by reference. Polydiorganosiloxane diamines having such high purity are prepared from the reaction of cyclic organosilanes and bis(aminoalkyl)disiloxanes utilizing an anhydrous amino alkyl functional silanolate catalyst such as tetramethylammonium 3-aminopropyldimethylsilanolate, preferably in an amount less than 0.15 weight percent based on the weight of the total amount of cyclic organosiloxane with the reaction run in two stages.

Particularly preferred polydiorganosiloxane diamines are prepared using cesium and rubidium catalysts. The preparation of polydiorganosiloxane diamine includes combining under reaction conditions (1) an anine functional endblocker represented by the formula

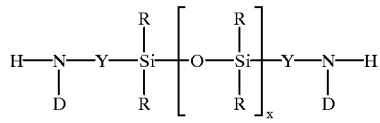

(IV)

wherein:
each R, D and Y are defined as above, and
x is an integer of about 1 to 150;

(2) sufficient cyclic siloxane to obtain a polydiorganosiloxane diamine having a number average molecular weight greater than the molecular weight of the endblocker; and (3) a catalytically effective amount of cesium hydroxide, rubidium hydroxide, cesium silanolate, rubidium silanolate, cesium polysiloxanolate, rubidium polysiloxanolate, and mixtures thereof The reaction is continued until substantially all of the amine functional endblocker is consumed.

The reaction is then terminated by adding a volatile organic acid to form a mixture of a polydiorganosiloxane diamine usually having greater than about 0.01 weight percent silanol impurities and one or more of the following: a cesium salt of the organic acid, a rubidium salt of the organic acid, or both such that there is a small molar excess of organic acid in relation to catalyst. The silanol groups of the reaction product are then condensed under reaction conditions to form polydiorganosiloxane diamine having less than or equal to about 0.01 weight percent silanol impurities while the unreacted cyclic siloxane is stripped. Optionally, the salt is removed by subsequent filtration.

Examples of polydiorganosiloxane diamines useful in the present invention include but are not limited to polydimethylsiloxane diamine, polydiphenylsiloxane diamine, polytrifluoropropylmethylsiloxane diamine, polyphenylmethylsiloxane diamine, polydiethylsiloxane diamine, polydivinylsiloxane diamine, polyvinylmethylsiloxane diamine, poly(5-hexenyl)methylsiloxane diamine, copolymers and mixtures thereof.

Examples of organic polyamines useful in the present invention include but are not limited to polyoxyalkylene diamines such as D-230, -400, -2000, -4000, BU-700, ED-2001, EDR-148 available from Huntsman, polyoxyalkylene triamines such as T-3000 and T-5000 available from Huntsman, and polyalkylenes such as Dytek A and Dytek EP available from DuPont.

Different polyisocyanates in the reaction will modify the properties of the polydiorganosiloxane polyurea segmented copolymer. For example, if a polycarbodiimide-modified diphenylmethane diisocyanate, such as ISONATE™ 143L, available from Dow Chemical Co., is used, the resulting polydiorganosiloxane polyurea segmented copolymer has enhanced solvent resistance when compared with copolymers prepared from other diisocyanates. If tetramethyl-m-xylylene diisocyanate is used, the resulting segmented copolymer has a very low melt viscosity that makes it particularly useful for injection molding.

Any polyisocyanate that can react with a polyamine, and in particular with polydiorganosiloxane diamine of Formula III can be used in the present invention. Examples of such diisocyanates include, but are not limited to, aromatic diisocyanates, such as 2,6-toluene diisocyanate, 2,5-toluene diisocyanate, 2,4-toluene diisocyanate, m-phenylene diisocyanate, p-phenylene diisocyanate, methylene bis(o-chlorophenyl diisocyanate), methylenediphenylene-4,4'-diisocyanate, polycarbodiimide-modified methylenediphenylene diisocyanate, (4,4'-diisocyanato-3,3',5,5'-tetraethyl) diphenylmethane, 4,4'-diisocyanato-3,3'-dimethoxybiphenyl(odianisidine diisocyanate), 5-chloro-2,4-toluene diisocyanate, 1-chloromethyl-2,4-diisocyanato benzene, aromatic-aliphatic diisocyanates such as m-xylylene diisocyanate, tetramethyl-m-xylylene diisocyanate, aliphatic diisocyanates, such as 1,4-diisocyanatobutane, 1,6-diisocyanatohexane, 1,12-diispcyanatododecane, 2-methyl-1,5-diisocyanatopentane, and cycloaliphatic diisocyanates such as methylenedicyclohexylene-4,4'-diisocyanate, 3-isocyanatomethyl-3,5,5-trimethylcyclohexyl isocyanate (isophorone diisocyanate), 2,2,4-trimethylhexyl diisocyanate, and cyclohexylene-1,4-diisocyanate and mixtures thereof.

Preferred diisocyanates include 2,6-toluene diisocyanate, methylenediphenylene-4,4'-diisocyanate, polycarbodiimide-modified methylenediphenyl diisocyanate, 4,4'-diisocyanato-3,3'-dimethoxybiphenyl(odianisidine diisocyanate), tetramethyl-m-xylylene diisocyanate, methylenedicyclohexylene-4,4'-diisocyanate, 3-isocyanatomethyl-3,5,5-trimethylcyclohexyl isocyanate (isophorone diisocyanate), 1,6-diisocyanatohexane, 2,2,4-trimethylhexyl diisocyanate, and cyclohexylene-1,4-diisocyanate.

Particularly preferred is tetramethyl-m-xylylene diisocyanate. Polydiorganosiloxane polyurea segmented copolymers produced using tetraniethyl-m-xylylene diisocyanate generally have lower melt viscosities than similar copolymers produced using other diisocyanates, and higher modulus.

Any triisocyanate that can react with a polyamine, and in particular with polydiorganosiloxane diamine of Formula III, can be used in the present invention. Examples of such triisocyanates include, but are not limited to, polyfunctional isocyanates, such as those produced from biurets, isocyanurates, adducts and the like. Some commercially available polyisocyanates include portions of the DESMODUR™ and MONDUR™ series from Bayer and the PAPI™ series of Dow Plastics.

Preferred triisocyanates include DESMODUR™ N-3300 and MONDUR™ 489.

Relative amounts of amine and isocyanate can be varied over a much broader range than those produced by previous methods. Molar ratios of isocyanate to amine continuously provided to the reactor are preferably from about 0.9:1 to 1.3:1, more preferably 1:1 to 1.2:1.

Once the reaction of the polyisocyanate with the polyamine has occurred, active hydrogens in the urea linkage may still be available for reaction with excess isocyanate. By increasing the ratio of isocyanate to amine, the formation of biuret moieties may be facilitated, especially at higher temperatures, resulting in branched or crosslinked polymer. Low to moderate amounts of biuret formation can be advantageous to shear properties and solvent resistance.

The composition of the present invention may also optionally contain various fillers and other property modifiers. Fillers such as fumed silica, carbon fibers, carbon black, glass beads, glass bubbles, glass fibers, mineral fibers, clay particles, organic fibers, e.g., nylon, KEVLAR™, metal particles, and the like can be added in amounts up to about 50 parts per 100 parts of polyorganosiloxane urea segmented polymer and silicate resin, provided that if and when incorporated, such additives are not detrimental to the function and functionality of the final polymer product. Other additives such as dyes, pigments, flame retardants, stabilizers, antioxidants, compatibilizers, antimicrobial agents such as zinc oxide, electrical conductors, thermal conductors such as aluminum oxide, boron nitride, aluminum nitride, and nickel particles, and the like can be blended into these systems in amounts of from about 1 to 50 volume percent of the composition.

In the process of the present invention, reactants, including at least one polyamine, wherein such polyamine is at least one polydiorganosiloxane diamine or a mixture of at least one polydiorganosiloxane diamine and at least one organic polyamine and at least one polyisocyanate diamine are mixed in a reactor and allowed to react to form the polydiorganosiloxane polyurea segmented copolymer that can then be removed from the reaction vessel.

In the process of the invention, the following reaction occurs:

Properties of the compositions of the present invention result from the copolymer molecular weight and architecture. Flexibility of the process of the present invention leads to interesting materials, some of which, though they maynot be fully soluble in solvents for inherent viscosity or molecular weight determination, may nevertheless be quite useful materials in terms of physical properties and can still be extrudable. One skilled in the art can expect the optimum material for a particular application to be a function of isocyanate-to-amine ratio, polyisocyanate and polyamine architecture, order of reactant addition, mixing speed, temperature, reactor throughput, reactor configuration and size, residence time, residence time distribution, and whether any fillers, additives, or property modifiers are added. This process allows the freedom to vary the molecular weight and architecture over quite a wide range, thus enabling one to tailor the properties to suit a variety of applications. The polydiorganosiloxane polyamine component employed to prepare polydiorganosiloxane polyurea segmented copolymers of this invention provides a means of adjusting the modulus of the resultant copolymer. In general, high molecular weight polydiorganosiloxane diamines provide copolymers of lower modulus, whereas low molecular weight polydiorganosiloxane diamines provide higher polydiorganosiloxane polyurea segmented copolymers of high modulus.

Any reactor that can provide intimate mixing of polyamine and polyisocyanate and the reaction products thereof is suitable for use in the invention. The reaction may be carried out as a batch process using, for example, a flask equipped with a mechanical stirrer, provided the product of the reaction has a sufficiently low viscosity at the processing temperature to permit mixing, or as a continuous process using, for example, a single screw or twin screw extruder. Preferably, the reactor is a wiped surface counter-rotating or co-rotating twin screw extruder.

The temperature in the reactor should be sufficient to permit the reaction between the polyisocyanate and the polyamine to occur. The temperature should also be sufficient to permit conveying of the materials through the reactor, and any subsequent processing equipment such as, for example, feedblocks and dies. For conveying the reacted material, the temperature should preferably be in the range of about 140 to 250° C., more preferably in the range of about 160 to 220° C. Residence time in the reactor typically varies from about 5 seconds to 8 minutes, more typically from about 15 seconds to 3 minutes.

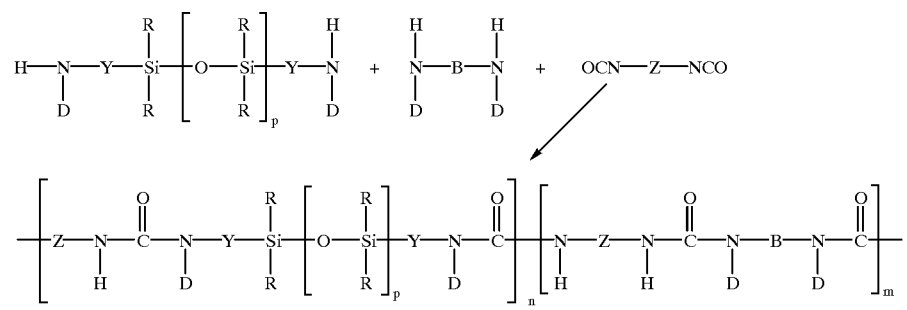

The residence time depends on several parameters, including, for example, the length to diameter ratio of the reactor, mixing rates, overall flowrates, reactants, and the need to blend in additional materials. For materials involving reaction with minimal or no blending of a nonreactive component, the reaction can easily take place in as little as 5:1 length to diameter units of a twin screw extruder.

When a wiped surface reactor is used, relatively close clearances between the screw flight lands and the barrel are preferred, with this value typically lying between 0.1 to about 2 mm. The screws utilized are preferably fully or partially intermeshing or fully or partially wiped in the zones where a substantial portion of the reaction takes place.

Because of the rapid reaction that occurs between the polyamine and the polyisocyanate, both materials are preferably fed into an extruder at unvarying rates, particularly when using higher molecular weight polyamines, that is, with number average molecular weights of about 50,000 and higher. Such feeding rates generally reduce undesirable variability of the final product.

One method of insuring the continuous feeding into the extruder when a very low flow polyisocyanate stream is used is to allow the polyisocyanate feed line to touch or very nearly touch the passing threads of the screws. Another method would be to utilize a continuous spray injection device that produces a continuous stream of fine droplets of polyisocyanates into the reactor.

Typically, in formulating polydiorganosiloxane polyurea segmented block copolymers with additives such as tackifying resins, inorganic fillers, or other materials essentially non-reactive with the polydiorganosiloxane polyurea segmented copolymer reactants, the additives to be blended are added further downstream in the reactor after a substantial portion of the reaction of the polyamine and polyisocyanate has taken place.

However, the various reactants and additives can be added in any order provided the addition of an additive does not interfere with the reaction of the reactants. For instance, an additive that is particularly reactive with a polyisocyanate reactant typically would not be added until after the reaction of the polyisocyanate with a polyamine reactant. Further, the reactants can be added simultaneously or sequentially into the reactor and in any sequential order. For example, the polyisocyanate stream can be the first component added into the reactor in a manner such as mentioned above. Polyamine can then be added downstream in the reactor. Alternately, the polyisocyanate stream can also be added after the polyamine has been introduced into the reactor.

The process of the present invention has several advantages over conventional solution polymerization processes for making polydiorganosiloxane polyurea segmented copolymers such as (1) the ability to vary the isocyanate to amine ratio to obtain materials with properties superior to solution polymerized materials, (2) the capability of polymerizing high molecular weight compositions that cannot be easily produced using solution polymerization, (3) the ability to directly produce shaped articles with reduced heat histories, (4) the ability to more easily blend in fillers, tackifying resins, plasticizers, and other property modifiers, and (5) the elimination of solvent.

The flexibility of altering the isocyanate to amine ratio in the continuous process is a distinct advantage. This ratio can be varied above and below the theoretical value of 1:1 quite easily. In solution, ratios much above about 1.05:1 and below 0.95:1 yield lower molecular weight copolymer. In the process of the present invention, polydiorganosiloxane polyurea segmented copolymers with ratios up to as high as 1.3:1, depending upon the titrated number average molecular weight of the polydiorganosiloxane diamine, can be produced. Such polymers possess inherent viscosities well above those made with conventional solution processes but can still be melt processed. These polymers can also possess superior mechanical properties when compared to solution polymerized copolymers. At some ratios, resultant polymers can become insoluble, precluding the possibility of inherent viscosity determination, but the material can be melt processable and possesses high strength.

The ability to make high molecular weight compositions that cannot be produced by solution polymerization due to the insolubility of the forming polymer in the solvent medium, leads to useful, unique compositions. When the chain extension of the polyamine is carried out in solution with certain polyisocyanates such as polycarbodiimide-modified diphenylmethane diisocyanate, available, for example, from Dow Chemical Co. as ISONATE™ 143L, newly forming polymer may precipitate out of solution, thus not enabling the formation of high molecular weight copolymer. When this composition is prepared using the solventless method of the present invention, high strength solvent resistant materials are formed. In a similar manner, materials made from a mixture of two widely dissimilar molecular weights of polyamine polymerized with a polyisocyanate using the solventless process of the present invention can be made with high inherent viscosities.

In general, long exposure to heat degrades polydiorganosiloxane polyurea segmented copolymers and leads to a degradation of physical properties. The degradation experienced by many of the solution polymerized polydiorganosiloxane polyurea segmented copolymers upon drying and subsequent hot melt extrusion is also overcome by the continuous process of the present invention because reactively extruded polydiorganosiloxane polyurea segmented copolymers can be extruded directly from the polymerization zone through a die to form shaped articles such as tubing and films without the additional heat history associated with solvent removal and the subsequent polymer reheating.

The ability to eliminate the presence of solvent during the reaction of polyamine and polyisocyanate yields a much more efficient reaction. The average residence time using the process of the present invention is typically 10 to 1000 times shorter than that required in solution polymerization. A small amount of non-reactive solvent can be added, if necessary, for example, from about 0.5% up to about 5% of the total composition, in this process either as a carrier for injecting otherwise solid materials or in order to increase stability of an otherwise low flowrate stream of material into the reaction chamber.

The objects, features and advantages of the present invention are further illustrated by the following examples, but the particular materials and amounts thereof recited in these examples, as well as other conditions and details, should not be construed to unduly limit this invention. All materials are commercially available or known to those skilled in the art unless otherwise stated or apparent. In the examples all parts and percentages are by weight unless otherwise indicated. All molecular weights reported are number average molecular weights in grams/mol.

Titration of Polydiorganosiloxane and Organic Polyamines

The actual number average molecular weight of polydiorganosiloxane or organic polyamines were determined by the following acid titration. Sufficient diamine to yield about 1 milliequivalent of amine is dissolved in 50/50 tetrahydrofuran/isopropyl alcohol to form a 10% solution, This solution is titrated with 0.1N hydrochloric acid with bromophenyl blue as an indicator to determine number average molecular weight. However, when the diamines were polydiorganosiloxane diamines, the molecular weights of these diamines were dependent on the exact ratio of the reactants used in the diamine synthesis and the extent of stripping cyclic siloxanes. Remaining cyclics are diluents which increase the apparent molecular weight of polydiorganosiloxane diamine.

Preparation of Polydiorganosiloxane Diamines
Polydimethylsilaxane Diamine A

A mixture of 4.32 parts bis(3-aminopropyl)tetramethyl disiloxane and 95.68 parts octamethylcyclotetrasiloxane was placed in a batch reactor and purged with nitrogen for 20 minutes. The mixture was then heated in the reactor to 150° C. Catalyst, 100 ppm of 50% aqueous cesium hydroxide, was added and heating continued for 6 hours until the bis(3-aminopropyl) tetramethyl disiloxane had been consumed. The reaction mixture was cooled to 90° C., neutralized with excess acetic acid in the presence of some triethylamine, and heated under high vacuum to remove cyclic siloxanes over a period of at least five hours. The material was cooled to ambient temperature, filtered to remove any cesium acetate which had formed, and titrated with 0.1N hydrochloric acid to determine number average molecular weight. Six lots of Polydimethylsiloxane Diamine A were made using this procedure. The molecular weights were Lot 1: 5280, Lot 2: 5570, Lot 3: 5330, Lot 4: 5310, Lot 5: 5270, and Lot 6: 5350.

Polydimethylsiloxane Diamine B

Polydimethylsiloxane diamine was prepared as described for Polydimethylsiloxane Diamine A except 2.16 parts bis (3-aminopropyl)tetramethyl disiloxane and 97.84 parts octamethylcyclotetrasiloxane were used. Two lots were made using this procedure. The molecular weights were Lot 1: 10,700 and Lot 2: 10,500.

Polydimethylsiloxane Diamine C

A mixture of 21.75 parts polydimethylsiloxane diamine A and 78.25 parts octamethylcyclotetrasiloxane was placed in a batch reactor, purged with nitrogen for 20 minutes and then heated in the reactor to 150° C. Catalyst, 100 ppm of 50% aqueous cesium hydroxide, was added and heating continued for 3 hours until equilibrium concentration of cyclic siloxanes was observed by gas chromatography. The reaction mixture was cooled to 90° C., neutralized with excess acetic acid in the presence of some triethylamine, and heated under high vacuum to remove cyclic siloxanes over a period of at least 5 hours. The material was cooled to ambient temperature, filtered, and acid titrated to determine the number average molecular weight. Two lots of Polydimethylsiloxane Diamine C were made using this procedure. The molecular weights were Lot 1: 22,300 and Lot 2: 17,000.

Polydimnethylsiloxane Diamine D

Polydimethylsiloxane diamine was prepared as described for Polydimethylsiloxane Diamine C except 12.43 parts Polydiorganosiloxane Diamne A and 87.57 parts octamethylcyclotetrasiloxane were used. Two lots were prepared. The molecular weights were Lot 1: 37,800, and Lot 2: 34,800.

Polydimethylsiloxane Diamine E

Polydimethylsiloxane diamine was prepared as described for Polydimethylsiloxane Diamine C except that 8.7 parts Polydimethylsiloxane Diamine A and 91.3 parts octamethylcyclotetrasiloxane were used. Two Lots were prepared. The molecular weights of the thus-produced Polydimethylsiloxane Diamine E were Lot 1: 58,700 and Lot 2: 50,200.

Polydimethylsiloxane Diamine F

Polydimethylsiloxane diamine was prepared as described for Polydimethylsiloxane Diamine C except that 4.35 parts Polydimethylsiloxane Diamine A and 95.65 parts octamethylcyclotetrasiloxane were used. The molecular weight of this Polydimethylsiloxane Diamine F was 105,000.

Polytrifluoropropylmethyldimethylsiloxane Diamine G

Polydimethylsiloxane diamine containing 10 mol % trifluoropropylmethyl and 90 mol % dimethylsiloxane units was made as described for the preparation of Polydimethylsiloxane Diamine A, except 8.70 parts (3,3, 3trifluoropropyl)-methylcyclosiloxane (Petrarch catalog number T2844), and 4.35 parts bis(3-aminopropyl) tetramethyl disiloxane and 86.96 parts octamethylcyclotetrasiloxane were used. The molecular weight of this Polytrifluoropropylmethyl-dimethylsiloxane Diamine G was 5440.

Polydimethylsiloxane Diamine H

Polydimethylsiloxane diamine was prepared by placing in a batch reactor under nitrogen purge and with stirring 1.98 parts bis(3-aminopropyl)tetramethyldisoloxane and 9.88 parts octamethylcyclotetrasiloxane. The mixture was heated to 91° C. and a trace (about 0.15 parts) of 3-aminopropyldimethyltetramethylammonium silanolate catalyst was added. To the resultant mixture was added dropwise over a 5 hour period 88.0 parts octamethylcyclotetrasiloxane. The reaction mixture was maintained at 91° C. for an additional 7 hours and was then heated to 149° C. for 30 minutes to decompose the catalyst. The product was then stripped at 91° C. and 2700 N/m$^2$ (2700 Pa) for about 120 minutes to remove volatile materials. The molecular weight of the resulting Polydimethylsiloxane Diamine H was 9970.

Polydimethylsiloaxane Diamine I

Polydimethylsiloxane diamine was prepared as described for Polydimethylsiloxane Diamine H except 4.42 parts bis (3-aminopropyl)tetramethyldisoloxane and 22.25 parts octamethylcyclotetrasiloxane were initially placed in the reactor. After heating, 0.03 parts 3-aminopropyldimethyltetramethylammonium silanolate catalyst, and 73.30 parts octamethylcyclotetrasiloxane were added. Two lots of this Polydimethylsiloxane Diamine I were prepared. The molecular weights were Lot 1: 4930 and Lot 2: 5260.

Polydiphenyldimedhylsilaxane Diamine J

To a 3-necked round bottom flask fit with mechanical stirrer, static nitrogen atmosphere, oil heating bath, thermometer, and reflux condenser, were added 75.1 parts octamethylcyclotetrasiloxane, 22.43 parts octaphenylcyclotetrasiloxane, and 2.48 parts bis(3-aminopropyl)tetramethyldisiloxane. Under static nitrogen atmosphere, the reactants were heated to 150° C. and degassed under aspirator vacuum for 30 seconds before restoring static nitrogen atmosphere. A charge of 0.02 parts cesium hydroxide solution (50% aqueous) was added to the flask and heating continued for 16 hours at 150° C. The flask was cooled to ambient temperature and then 2 mL triethylamine and 0.38 ML acetic acid were added. With good agitation flask was placed under a vacuum of 100 N/M$^2$ (100 Pa), heated to 150° C., and maintained at 150° C. for 5 hours to remove volatile materials. After 5 hours heat was removed and contents cooled to ambient temperature. Two lots of Polydiphenyldimethylsiloxane Diamine J were prepared. The molecular weights were Lot 1—9330 and Lot 2—9620.

In the following examples, all polyisocyanates and organic polyamines were used as received and the isocyanate to amine ratios were calculated using the polyisocyanate molecular weight reported by the polyisocyanate supplier and the polydiorganosiloxane and organic polyamine molecular weights, wherein the molecular weights were determined by acid titration and/or supplied by the supplier.

Test Methods

The following test methods were used to characterize the polydiorganosiloxane polyurea segmented copolymers produced in the following examples:

Inherent Viscosity

Average inherent viscosities (IV) were measured at 30° C. using a Canon-Fenske viscometer (Model No. 50 P296) in a chloroform solution at 30° C. at a concentration of between 0.18 and 0.26 g/dL. Inherent viscosities of the materials of the invention were found to be essentially independent of concentration in the range of 0.1 to 0.4 g/dL. The average inherent viscosities were averaged over 3 or more runs. Any variations for determining average inherent viscosities are set forth in specific Examples.

Gel Permeation Chromatography

The weight average and number average molecular weights of selected polydimethylsiloxane polyurea segmented copolymers were determined via gel permeation chromatography with a HP 1090 Chronatograph equipped with a HP 1037A Refractive Index detector, a Waters 590 pump, a Waters Wisp auto-injector and a Kariba column oven at room temperature. The copolymer was dissolved in DMF w/v 0.05% LiBr at 15 mg/mL, filtered with a 0.2 micrometer nylon filter, and 100 microliters injected into a Jordi Mixed Bed column. The elution rate was 0.5 mL/min in DMF+0.05% w/v LiBr. Calibration was based on polystyrene standards from Pressure Chemical Company, Pittsburgh, Pa. Reported molecular weights are the polystyrene equivalents.

Mechanical Properties

The polydiorganosiloxane polyurea segmented copolymers were tested for mechanical properties by preparing a 10% solution of the copolymer in tetrahydrofuran or 50/50 toluene/isopropanol and pouring the solution into a Petri dish. The solvent was allowed to evaporate to produce films from about 0.4 to 1.5 mm thick.

Mechanical testing was performed on an INSTRON™ Model 1122 tensile tester. Testing was performed according to a modification of ASTM D412-83. Samples were prepared according to Method B (cut ring specimens). Type 1 rings (5.1 cm circumference) were produced with a specially-designed precision ring cutter. The INSTRON™ analog output signal was routed to a digital voltmeter with accuracy better than 0.5% and the digital readings were recorded by a computer. Modifications to the ASTM test were as follows: the crosshead speed was 12.7 cm/mn; the test fixture shafts (upper and lower jaw) rotated At 30 rpm in the same direction to maintain uniform strain throughout the entire ring. Modulus, maximum stress and elongation at break were then calculated.

EXAMPLES

Examples 1–3 and Comparative Example 1

In Example 1, methylenedicyclohexylene-4,4'-diisocyanate (DESMODUR™ W, obtained from Miles Laboratories, Inc., Pittsburgh, Pa.) was fed into the first zone of an 18 mm co-rotating twin screw extruder having a 40:1 length diameter ratio (available from Leistritz Corporation, Allendale, N.J.) at a rate of 0.397 g/min (0.00152 mol/min) under nitrogen atmosphere. The feed line of the diisocyanate was placed close enough to the screw that each passing of the screw threads took a small amount of diisocyanate onto the screw, resulting in a complete wetting of the screw forward of this addition point and dry screws behind this point. The extruder had double-start fully intermeshing screws throughout the entire length of the barrel, rotating at 100 revolutions per minute. Kneading blocks 20 mm in length were placed in zones 3, 4, and 5. Polydimethylsiloxane Diamine A, Lot 2, molecular weight 5570, was injected into the second zone at a rate of 8.0 g/min (0.00144 mol/min). The temperature profile for each of the 90 mm zones was: zone 1—30° C.; zone 2—75° C.; zone 3— 120° C.; zone 4—130° C.; zone 5—140° C.; zone 6—150° C.; zone 7—155° C.; zone 8—170° C.; and endcap—170° C. The resultant polydimethylsiloxane polyurea segmented copolymer was extruded into a 3 mm diameter strand, cooled in air, and collected. The inherent viscosity, modulus, stress and elongation at break were determined. The results are set forth in Table 1 together with the NCO:NH$_2$ ratio.

In Examples 2 and 3, polydiorganosiloxane polyurea segmented copolymers were prepared and tested as in Example 1 except the feed rates of the diisocyanate were 0.372 g/min (0.00142 mol/min) and 0.350 g/min (0.00134 mol/min), respectively. The results are set forth in Table 1.

In Comparative Example 1, 20 grams Polydimethylsiloxane Diamine A, Lot 3, molecular weight 5330, were placed in a 1-neck 250 mL round bottom flask under heat and vacuum and degassed. A magnetic stir bar was then added, the flask was purged with argon, and 170 grams dichloromethane were added. A solution of 1.05 grams methylenedicyclohexylene-4,4'-diisocyanate in 3 mL dichloromethane were added to the diamine/dichloromethane solution while stirring rapidly. The viscosity increased during the addition of the diisocyanate. Stirring of the solution was continued for 30 minutes. The polydimethylsiloxane polyurea segmented copolymer solution was then poured from the flask into a Petri dish and a film was formed. The film was tested for inherent viscosity, modulus, maximum stress, and elongation at break. The results as well as the NCO:NH$_2$ ratio is set forth in Table 1.

TABLE 1

| Example | NCO:NH$_2$ | Inherent viscosity (dL/g) | Modulus (MN/m$^2$) | Maximum stress (MN/m$^2$) | Maximum elongation at break (%) |
|---|---|---|---|---|---|
| 1 | 1.06:1 | 2.13 | 1.38 | 5.34 | 830 |
| 2 | 0.99:1 | 0.67 | — | — | — |
| 3 | 0.93:1 | 0.46 | 0.92 | 1.90 | 650 |
| C1 | 1.07:1 | 0.50 | 1.16 | 1.92 | 650 |

The data in Table 1 demonstrates that the copolymer of Example 1 has a much higher inherent viscosity and greater strength than that of Comparative Example 1 which has a similar NCO:NH$_2$ ratio. Also as the amount of diisocyanate is reduced relative to the polydimethylsiloxane diamine, the inherent viscosity, modulus, maximum stress and maximum elongation at break become lower.

Examples 4–16 and Comparative Example C2

In Example 4, methylenedicyclohexylene-4,4'-diisocyanate was fed into zone six of the extruder used in Examples 1–3 at a rate of 1.32 g/min (0.00503 mol/min). The diisocyanate line was brushing the screw threads. Polydimethylsiloxane diamine (obtained from Shin-Etsu Silicones of America, Inc., as X-22-161A, Lot 110,050, molecular weight 1630) was injected into zone seven of the extruder at a rate of 7.7 g/min (0.00472 mol/min). The screws were fully intermeshing double start 12 mm pitch counter-rotating elements rotating at 100 revolutions per minute. The temperature profile for each of the 90 mm zones was: zones 1 through 5—temperatures not controlled; zone 6—55° C.; zone 7— 85° C.; zone 8—150° C.; and endcap—180° C. The thus-formed polydimethylsiloxane polyurea segmented copolymer was extruded through a die. The resultant extrudate was 3 cm in diameter. The extrudate was cooled in air and collected.

In Example 5, a polydimethylsiloxane polyurea segmented copolymer was produced as in Example 1, except that the diisocyanate was fed at a rate of 1.20 g/min (0.00458 mol/min) into the sixth zone of the 18 mm extruder. Polydimethylsiloxane diamine (Shin-Etsu X-22-161A, Lot 112, 052, molecular weight 1620) was injected at a rate of 7.7 g/min (0.00475 mol/min) into the seventh zone of the extruder. The screw speed was 150 revolutions per minute and the extruder temperatures were: zones 1 through 5—40° C.; zone 6—60° C.; zone 7—100° C.; zone 8—154° C.; and endcap—170° C.

In Example 6, a polydimethylsiloxane polyurea segmented copolymer was produced as in Example 5 except that the diisocyanate was fed at a rate of 0.800 g/min (0.00305 mol/min), the polydimethylsiloxane diamine was PS 510, obtained from Hüls America Inc., Piscataway, N.J., molecular weight was 2630, the diamine was injected at a rate of 7.7 g/min (0.00293 mol/min), and the temperature of zone 8 was 150° C.

In Example 7, a polydimethylsiloxane polyurea segmented copolymer was prepared as in Example 6 except the diisocyanate was fed at a rate of 0.762 g/min (0.00291 mol/min).

In Example 8, a polydimethylsiloxane polyurea segmented copolymer was prepared as in Example 1 except the diisocyanate was fed at a rate of 0.207 g/min (0.000790 mol/min), the polydimethylsiloxane diamine used was Diamine B, Lot 1, molecular weight 10,700, and the diamine was fed at a rate of 7.9 g/min (0.000738 mol/min).

In Example 9, a polydimethylsiloxane polyurea segmented copolymer was prepared as in Example 8 except the diisocyanate was fed at a rate of 0.205 g/min (0.000782 mol/min).

In Example 10, a polydimethylsiloxane polyurea segmented copolymer was prepared as in Example 8 except the diisocyanate was fed at a rate of 0.201 g/min (0.000767 mol/min).

In Example 11, a polydimethylsiloxane polyurea segmented copolymer was prepared as in Example 8 except the diisocyanate was fed at a rate of 0.197 g/min (0.000752 mol/min).

In Example 12, a polydimethylsiloxane polyurea segmented copolymer was prepared as in Example 1, except the diisocyanate was fed at a rate of 0.112 g/min (0.000427 mol/min), Polydimethylsiloxane Diamine C, molecular weight 22,300, was used instead of Diamine A and was fed at a rate of 7.9 g/min (0.000354 mol/min).

In Example 13, a polydimethylsiloxane polyurea segmented copolymer was prepared as in Example 1 except the diisocyanate was fed at a rate of 0.069 g/min (0.000263 mol/min), the polydimethylsiloxane diamine was Diamine D. Lot #1, molecular weight 37,800, in place of Diamine A and Diamine D was fed at a rate of 8.0 g/min (0.000212 mol/min).

In Example 14, a polydimethylsiloxane polyurea segmented copolymer was prepared as in Example 13 except the diamine was fed at a rate of 0.060 g/min (0.000229 mol/min).

In Example 15, a polydimethylsiloxane polyurea segmented copolymer was prepared by injecting polydimethylsiloxane diamine, Diamine F, 105,000 molecular weight, at a rate of 13.6 g/min (0.000130 mol/min) into zone 5 of a Leistritz 34 mm 8 zone counter-rotating fully intermeshing twin screw extruder. Methylenedicyclohexylene-4,4'-diisocyanate was added into open zone 6 at a rate of 0.033 g/min (0.000126 mol/min) with the feed line brushing the screws. The temperature profile for each of the 160 mm long zones was: zone 4—25° C.; zone 5—50° C.; zone 6—75° C.; zone 7—120° C.; zone 8—150° C.; and endcap—180° C. The screw speed was 25 revolutions per minute.

In Example 16, a polydimethylsiloxane polyurea segmented copolymer was prepared and tested as in Example 1, except the methylenedicyclohexylene-4,4'-diisocyanate was fed at a rate of 0.190 g/min (0.000725 mol/min) and Diamine A was replaced with a homogeneous blend of 25.0 percent by weight Diamine A, Lot 2, 5,570 molecular weight, and 75.0 percent by weight Diamine E, Lot 2, 50,200 molecular weight, mixed one day in advance of the reaction, and this diamine mixture (calculated number average molecular weight of 16,700) was fed at a rate of 11.3 g/min (0.000677 mol/min).

In Comparative Example C2, 20 grams of Polydimethylsiloxane Diamine B, Lot 2, 10,500 molecular weight, were degassed in a 1-neck 250 mL round bottom flask under heat and vacuum. A magnetic stir bar was then added. The flask was purged with argon and 170 grams of dichloromethane were added. A solution of 0.50 grams methylenedicyclohexylene-4,4'-diisocyanate in 3 mL dichloromethane was added to the diamine/dichloromethane solution while stirring rapidly. The viscosity increased during the addition of the diisocyanate. Stirring of the solution continued for 30 minutes to form a polydimethylsiloxane polyurea segmented copolymer. The polymer solution was then poured from the flask into a Petri dish and allowed to dry to form a film.

The materials produced in each of Examples 4–12 were tested for inherent viscosity (IV) and mechanical properties and Comparative Example C2 was tested for inherent viscosity. The results together with the NCO:NH$_2$ ratios and the molecular weight of the polydimethylsiloxane diamine (Diamine MW), are reported in Table 2.

TABLE 2

| Ex | Diamine MW | NCO:NH$_2$ ratio | IV (dL/g) | Modulus (MN/m$^2$) | Maximum stress (MN/m$^2$) | Elongation at break (%) |
|---|---|---|---|---|---|---|
| 4 | 1630 | 1.07:1 | 0.28 | 17.0 | 10.6 | 450 |
| 5 | 1620 | 0.96:1 | 0.19 | 8.69 | 5.70 | 480 |
| 6 | 2630 | 1.04:1 | 0.43 | 4.57 | 6.10 | 730 |
| 7 | 2630 | 0.99:1 | 0.27 | 3.56 | 5.23 | 680 |
| 8 | 10,700 | 1.07:1 | 1.52 | 0.68 | 3.46 | 970 |
| 9 | 10,700 | 1.06:1 | 0.90 | 0.68 | 2.46 | 820 |
| 10 | 10,700 | 1.04:1 | 0.75 | 0.60 | 1.54 | 840 |
| 11 | 10,700 | 1.02:1 | 0.65 | 0.60 | 1.06 | 470 |
| C2 | 10,500 | 1.00:1 | 0.37 | — | — | — |
| 12 | 22,300 | 1.17:1 | 3.02 | 0.37 | 1.73 | 940 |
| 13 | 37,800 | 1.24:1 | 3.22 | 0.34 | 2.50 | 1170 |
| 14 | 37,800 | 1.08:1 | 1.31 | 0.19 | 0.59 | 510 |
| 15 | 105,000 | 0.97:1 | 2.51 | 0.34 | 0.31 | 500 |
| 16 | 5000/50,000 | 1.07:1 | 1.69 | 0.41 | 1.0 | 550 |

As can be seen from the data in Table 2 at higher ratios of diisocyanate to diamine, the inherent viscosities of the polydimethylsiloxane polyurea segmented copolymers increased. Example 11 and Comparative Example C2 demonstrate that at similar NCO:NH$_2$ ratios, the material prepared using the solventless method of the present invention has substantially higher inherent viscosity than that prepared using a conventional solvent process. The product of Example 16 cannot be made using conventional solvent preparation methods due to the insolubility of the forming polymer in the reacting solution mixture.

Examples 17–21

In Example 17, Polydimethylsiloxane Diamine D, Lot #1, 37,800 molecular weight, was fed at a rate of 38.5 g/min (0.00102 mol/min) into the back of the first zone of a Berstorff 40 mm diameter 1600 mm length corotating twin screw extruder. Methylenedicyclohexylene-4,4'-diisocyanate was fed at a rate of 0.301 g/min (0.00115 mol/min) into the forward portion of the first zone to provide an NCO:NH$_2$ ratio of 1.13:1. The feed line of the diisocyanate was lightly brushing the screw threads. Double-start fully intermeshing screws were used throughout the entire length of the barrel, rotating at 25 revolutions per minute. The temperature profile for each of the 160 mm zones was: zone 1—20°; zone 2— 100° C.; zone 3—150° C.; zones 4 through 9—180° C.; zone 10—60° C.; endcap and melt pump—180° C. The resultant polydimethylsiloxane polyurea segmented copolymer was extruded into a 3 mm diameter strand, cooled in air, and collected.

In Example 18, a polydimethylsiloxane polyurea segmented copolymer was prepared as in Example 17 except that the screw speed was 400 revolutions per minute.

In Example 19, polydimethylsiloxane polyurea segmented copolymer was prepared as in Example 17, except the diamine was fed into the back of zone 8 and the diisocyanate was fed into the front of zone 8 with the feed line brushing the screws. The screw speed was 400 revolutions per minute. The temperature profile of the extruder was: zone 1—20° C.; zones 2 through 7—40° C.; zone 8 50° C.; zone 9—110° C.; zone 10—140° C.; endcap and melt pump—180° C.

In Example 20, polydimethylsiloxane polyurea segmented copolymer was prepared as in Example 17 except the diisocyanate feed line was not touching the screws, the screw speed was 400 revolutions per minute, and the temperature profile of the extruder was: zone 1—20° C.; zones 2 through 7—40° C.; zone 8 45° C.; zone 9—100° C.; zone 10—140° C.; endcap and melt pump—180° C.

In Example 21, polydimethylsiloxane polyurea segmented copolymer was prepared as in Example 17 except the temperature profile of the extruder was: zone 1—20° C.; zone 2—100° C.; zone 3—170° C; zones 4 through 9—220° C.; zone 10—200° C.; endcap and melt pump—220° C.

The temperature at the melt pump, the screw speed, and the effective extruder reaction length for each Example are set forth in Table 3. Each material of Examples 17–21 was tested for inherent viscosity and physical properties. When dissolved in solvent for testing of physical properties, gel-like particles were observed in the copolymer of Example 21 and were filtered out before testing. The inherent viscosity (IV), modulus, maximum stress, and maximum elongation at break are reported in Table 3.

TABLE 3

| Ex. | Pump temp. (° C.) | Screw speed (rpm) | Reaction length (L/D) | IV (dL/g) | Modulus (MN/m$^2$) | Maximum stress (MN/m$^2$) | Elongation at break (%) |
|---|---|---|---|---|---|---|---|
| 17 | 180 | 25 | 38 | 1.45 | 0.31 | 0.37 | 410 |
| 18 | 180 | 400 | 38 | 1.59 | 0.33 | 0.39 | 470 |
| 19 | 180 | 400 | 10 | 1.91 | 0.35 | 0.60 | 650 |
| 20 | 180 | 400 | 10 | 1.79 | 0.34 | 0.52 | 550 |
| 21 | 220 | 25 | 38 | 1.17 | 0.14 | 0.17 | 560 |

As can be seen from the data in Table 3, by varying process conditions while using the same diamine and diisocyanate and maintaining constant NCO:NH$_2$ ratios, polydimethylsiloxane polyurea segmented copolymers can be produced with varying inherent viscosities. Increasing the rotation speed of the screws in the extruder increased the inherent viscosity. For the longer residence time (38 L/D), the lower temperature resulted in higher inherent viscosities. Feeding the diisocyanate such that the feed line for the diisocyanate was lightly brushing the screw threads rather than being fed directly into a zone also increased the inherent viscosity due to the more consistent addition and intimate blending of the diamine and diisocyanate.

Examples 22–28

In Example 22, a polydimethylsiloxane polyurea segmented copolymer was prepared as in Example 1, except the diisocyanate used was tetramethyl-m-xylylene diisocyanate which was fed at a rate of 0.745 g/min (0.00305 mol/min), and the diamine was PS 510, available from Hüls America, Inc., molecular weight 2630, which was injected at a rate of 7.9 g/min (0.00300 mol/min).

In Example 23, Polydimethylsiloxane Diamine A, Lot 3, was injected at a rate of 76.1 g/min (0.0143 mol/min) into zone 2 of a 10 zone Berstorff 40 mm diameter, 1600 mm long, co-rotating twin screw extruder. The extruder was fitted with fully self-wiping double-start screws. Tetramethyl-m-xylylene diisocyanate was fed into zone 8 of the extruder at a rate of 3.97 g/min (0.0163 mol/min) with the feed line brushing the screws. The extruder screw speed was 100 revolutions per minute and the temperature profile for each of the 160 mm zones was: zone 1—27° C.; zones 2 through 8—60° C.; zone 9—120° C.; zone 10— 175° C.; and endcap—180° C. The resultant polymer was extruded into a 3 mm diameter -strand, cooled in a water bath, pelletized, and collected.

In Example 24, 95.70 grams Diamine A, Lot 1, 5280 molecular weight, were degassed in a 3-neck 1000 mL round bottom flask under heat and vacuum. An overhead mechanical stirrer was then added, the flask was purged with argon, and 800 mL of toluene were added. Then, 4.35 grams tetramethyl-m-xylylene diisocyanate were dropwise added to the diamineptoluene solution over approximately two minutes. The solution was stirred rapidly during this addition. The viscosity increased to the point that, after one hour, the solution could no longer be stirred. The solution was then diluted with 60 mL of 2-propanol and allowed to mix overnight. The resulting solution of polydimethylsiloxane polyurea segmented copolymer was then poured from the flask into a Petri dish and allowed to dry to form a film.

In Example 25, 125 grams Polydimethylsiloxane Diamine A, Lot 2, 5,570 molecular weight, was charged into a 3 neck 250 mL round bottom flask equipped with a mechanical stirrer and heated to 185° C. under an argon purge. Then, 6.10 grams tetramethyl-m-xylylene diisocyanate was added dropwise. The viscosity rose slightly with each drop added, but remained easy to stir. After the diisocyanate addition, the hot polydimethylsiloxane polyurea segmented copolymer was cast in a tray to cool and immediately formed a film.

In Example 26, a polydimethylsiloxane polyurea segmented copolymer was as in Example 23, except the tetramethyl-m-xylylene diisocyanate was fed at a rate of 2.01 g/min (0.00824 mol/min), and the diamine was Diamine H, molecular weight of 9,970, which was fed at a rate of 75.5 g/min (0.00760 mol/min).

In Example 27, a polydimethylsiloxane polyurea segmented copolymer was prepared by injecting polydimethylsiloxane diamine, Diamine C, 22,300 molecular weight, at a rate of 25.4 g/min (0.00114 mol/min) into zone 5 of a Leistritz 34 mm 8 zone counter-rotating fully intermeshing twin screw extruder. Tetramethyl-m-xylylene diisocyanate was added into open zone 6 at a rate of 0.306 g/min (0.00125 mol/min) with the feed line brushing the screws. The temperature profile for each of the 120 mm long zones was: zone 4—25° C.; zone 5—50 ° C.; zone 6— 75° C.; zone 7—120° C.; zone 8—150° C.; and endcap—180° C. The screw speed was 45 revolutions per minute.

In Example 28, polydimethylsiloxane polyurea segmented copolymer was prepared as in Example 4, except the diisocyanate was a 50/50 blend by weight of methylenedicyclohexylene-4,4'-diisocyanate and tetramethyl-m-xylylene diisocyanate fed at a rate of 0.425 g/min (0.00168 mol/min), and polydimethylsiloxane diamine was Diamine I, Lot 1, 4,930 molecular weight, which was injected at a rate of 7.8 g/min (0.00158 mol/min).

Inherent viscosities and physical properties were determined for the products of Examples 23, 26, 27 and 28. Inherent viscosities were determined for the products of Examples 22, 24 and 25. The results as well as the diamine molecular weight and the NCO:NH$_2$ ratio are set forth in Table 4.

TABLE 4

| Ex. | Diamine MW | NCO:NH$_2$ ratio | IV (dL/g) | Modulus (MN/m$^2$) | Maximum stress (MN/m$^2$) | Maximum elongation at break (%) |
|---|---|---|---|---|---|---|
| 22 | 2630 | 1.02:1 | 0.50 | — | — | — |
| 23 | 5330 | 1.14:1 | 0.46 | 5.43 | 1.79 | 310 |
| 24 | 5280 | 0.98:1 | 0.57 | — | — | — |
| 25 | 5570 | 1.11:1 | 0.60 | — | — | — |
| 26 | 9970 | 1.08.1 | 0.83 | 1.75 | 1.25 | 241 |
| 27 | 22,300 | 1.08:1 | 2.31 | 0.67 | 1.20 | 750 |
| 28 | 4930 | 1.06:1 | 0.51 | 2.48 | 1.92 | 450 |

As can be seen from the data in Table 4, the inherent viscosity generally ses with increasing molecular weight of the diamine.

Table 5 shows viscosity as a function of shear rate at 180° C. for Examples 2, Example 23 and Example 28.

TABLE 5

| Shear Rate (1/s) | Viscosity (poise) | | |
|---|---|---|---|
| | Example 2 | Example 23 | Example 28 |
| 0.10 | — | 83.7 | — |
| 1.00 | — | 82.8 | — |
| 1.58 | — | 82.3 | — |
| 2.51 | — | 81.0 | — |
| 3.98 | — | 80.2 | — |
| 6.31 | 49900 | 79.5 | — |
| 10.0 | 39900 | 78.9 | — |
| 15.8 | 31800 | 78.3 | — |
| 25.1 | 24000 | 76.4 | 5850 |
| 39.8 | 18300 | 74.9 | 4780 |
| 63.1 | 14200 | 71.7 | 3830 |
| 100 | 10600 | 68.0 | 2970 |
| 158 | 7670 | — | 2300 |
| 251 | 5410 | — | 1790 |
| 398 | 3760 | — | 1390 |
| 631 | 2560 | — | 1060 |
| 1000 | 1750 | — | 806 |
| 1580 | 1190 | — | — |
| 2510 | 798 | — | — |
| 3980 | 532 | — | — |

As can be seen from the data in Table 5, the polydimethylsiloxane polyurea segmented copolymer of Example 2, made with methylenedicyclohexylene-4,4'-diisocyanate, possesses the shear thinning behavior expected of such a polymer. The viscosity of the polydimethylsiloxane polyurea segmented copolymer of Example 23, made with tetramethyl-m-xylylene diisocyanate, remains relatively constant with increasing shear rate. The viscosity of the copolymer of Example 23 is also two to three orders of magnitude lower than that of the copolymer of Example 2 in this range of shear rates, yet the inherent viscosities of these materials are similar. The low viscosity, nearly Newtonian behavior of the polydimethylsiloxane polyurea segmented copolymers made with tetramethyl-m-xylylene diisocyanate can have certain processing advantages over the high melt viscosity, shear thinning behavior of materials made with methylenedicyclo-hexylene-4,4'-diisocyanate. The polydimethylsiloxane polyurea segmented copolymer of Example 28, made from a blend of the two diisocyanates used in Examples 2 and 23, has a viscosity between that of copolymers of Examples 2 and 23, illustrating that the rheological properties of the system can be tuned with the appropriate selection of diisocyanates.

Polydimethylsiloxane polyurea segmented copolymers made with tetramethyl-m-xylylene diisocyanate can have mechanical properties quite unique from those of other polydiorganosiloxane polyurea segmented copolymers. Table 5 shows the shear storage modulus (G) as a function of temperature and frequency for the polydimethylsiloxane polyurea segmented copolymers of Examples 23 and 2, respectively. This dynamic mechanical data was obtained using a Mark II Dynamic Mechanical Thermal Analyzer available from Polymer Laboratories, at a strain of 0.8%. The materials were run in shear mode at 0.3, 3 and 30 Hz over a temperature range of from −150° C. to 200° C. at a rate of 2° C./min.

TABLE 6

| | Log [Storage Modulus] (Pa) | | | | | |
|---|---|---|---|---|---|---|
| | Example 2 | | | Example 23 | | |
| Temp (° C.) | 0.3 Hz | 3 Hz | 30 Hz | 0.3 Hz | 3 Hz | 30 Hz |
| −150 | — | — | — | 7.92 | 7.92 | 7.92 |
| −140 | 8.02 | 8.03 | 8.03 | 7.92 | 7.92 | 7.91 |
| −130 | 8.02 | 8.02 | 8.03 | 7.92 | 7.91 | 7.91 |
| −120 | 8.02 | 8.02 | 8.02 | 7.92 | 7.92 | 7.92 |
| −110 | 7.76 | 7.92 | 7.97 | 7.86 | 7.91 | 7.92 |
| −100 | 6.28 | 6.62 | 7.16 | 6.86 | 7.17 | 7.53 |
| −90 | 5.94 | 6.05 | 6.26 | 6.40 | 6.51 | 6.77 |
| −80 | 6.18 | 6.27 | 6.32 | 6.40 | 6.44 | 6.50 |
| −70 | 7.20 | 7.23 | 7.30 | 6.62 | 6.63 | 6.66 |
| −60 | 7.16 | 7.20 | 7.25 | 6.61 | 6.63 | 6.65 |
| −50 | 6.69 | 6.73 | 6.74 | 6.49 | 6.52 | 6.53 |
| −40 | 5.90 | 5.91 | 5.95 | 6.33 | 6.35 | 6.37 |
| −30 | 5.87 | 5.89 | 5.91 | 6.32 | 6.35 | 6.36 |
| −20 | 5.88 | 5.91 | 5.93 | 6.33 | 6.36 | 6.38 |
| −10 | 5.90 | 5.93 | 5.96 | 6.34 | 6.37 | 6.40 |
| 0 | 5.92 | 5.95 | 5.98 | 6.35 | 6.38 | 6.40 |
| 10 | 5.92 | 5.97 | 6.00 | 6.36 | 6.39 | 6.41 |
| 20 | 5.91 | 5.97 | 6.01 | 6.36 | 6.40 | 6.42 |
| 30 | 5.88 | 5.97 | 6.02 | 6.36 | 6.40 | 6.43 |
| 40 | 5.83 | 5.95 | 6.02 | 6.37 | 6.41 | 6.44 |
| 50 | 5.76 | 5.91 | 6.00 | 6.37 | 6.42 | 6.45 |
| 60 | 5.65 | 5.85 | 5.97 | 6.39 | 6.43 | 6.46 |
| 70 | 5.54 | 5.77 | 5.93 | 6.41 | 6.44 | 6.47 |
| 80 | 5.44 | 5.68 | 5.87 | 6.42 | 6.46 | 6.48 |
| 90 | 5.34 | 5.57 | 5.80 | 6.44 | 6.47 | 6.49 |
| 100 | 5.25 | 5.48 | 5.70 | 6.45 | 6.48 | 6.50 |

TABLE 6-continued

| | Log [Storage Modulus] (Pa) | | | | | |
|---|---|---|---|---|---|---|
| | Example 2 | | | Example 23 | | |
| Temp (° C.) | 0.3 Hz | 3 Hz | 30 Hz | 0.3 Hz | 3 Hz | 30 Hz |
| 110 | 5.14 | 5.40 | 5.61 | 6.45 | 6.49 | 6.51 |
| 120 | 5.01 | 5.31 | 5.53 | 6.45 | 6.49 | 6.51 |
| 130 | 4.83 | 5.21 | 5.45 | 6.44 | 6.48 | 6.50 |
| 140 | 4.59 | 5.09 | 5.38 | 6.38 | 6.46 | 6.48 |
| 150 | 4.29 | 4.94 | 5.29 | 6.25 | 6.34 | 6.39 |
| 160 | 3.86 | 4.74 | 5.19 | 4.70 | 5.03 | 5.56 |
| 170 | | | | 3.80 | 2.45 | 3.57 |

As can be seen from the data in Table 6, the storage modulus of the polydimethylsiloxane polyurea segmented copolymer of Example 2 increased slightly from about −50 to 50° C., then above about 50° C., the copolymer begins to orage modulus becomes frequency dependent. The polydimethylsiloxane polyurea segmented copolymer of Example 23 possesses a storage modulus higher than that of the polydimethylsiloxane polyurea segmented copolymer of Example 2 and shows a gradual increase between about −50 and 150° C. At 150° C., the storage modulus drops off precipitously, as in a melting transition. Further, from 0.3 to 30 Hz, the polydimethylsiloxane polyurea segmented copolymer shear storage modulus of Example 23 is not frequency dependent.

Example 29

The pellets of Example 23 were fed into an Arburg 170 CMD Allrounder 150-45 injection molder and molded using a hexagonal flat die with lettering. Screw temperatures of the injection molder were: zone 1—124° C., zone 2—132° C., zone 3—160° C., and nozzle—1620. A separate curing step was not needed due to the thermoplastic elastomeric nature of this polydimethylsiloxane polyurea segmented copolymer. The resultant injection molded samples were quite strong immediately upon ejection from the mold. These samples were non-tacky and non-oily, there was no loss in clarity from the molding operation, and the injection molded part retained all detail in lettering of the original mold. The inherent viscosity of the sample after the injection molding operation was 0.47 dL/g, indicating that no degradation had occurred.

Examples 30–32 and Comparative Example C3

In Example 30, polycarbodiimnide-modified methylene diphenylene diisocyanate, ISONATE™ 143L, available from Dow Chemical Co., was fed at a rate of 0.298 g/min (0.00206 equivalents of isocyanate/min) into the first zone of a Leistritz 18 mm diameter 720 mm long counter-rotating twin screw extruder with the diisocyanate line brushing the screw threads. Diamine A, Lot 3, molecular weight 5330, was injected into zone 2 of the extruder at a rate of 6.1 g/min (0.00114 mol/min) to provide an NCO:NH$_2$ ratio of 0.90:1. The screws were fully intermeshing double start 12 mm pitch elements rotating at 100 revolutions per minute. The temperature profile for each of the 90 mm zones was: zone 1— 30° C.; zone 2—33° C.; zone 3—38° C.; zone 4—50° C.; zone 5—50° C.; zone 6—77° C.; zone 7—150° C.; zone 8—180° C.; and endcap—180° C. The resultant extrudate, 3 cm diameter, was cooled in air and collected. This polydimethylsiloxane polyurea segmented copolymer was solvent resistant, only swelling in tetrahydrofuran. The product had a Shore A hardness of 44. The inherent viscosity could not be determined due to the insolubility of the copolymer in tetrahydrofuran and chloroform.

In Example 31, 1,6-diisocyanatohexane was fed at a rate of 0.999 g/min (0.00595 mol/min) into the first zone of a Leistritz 34 mm diameter 1200 mm long counter-rotating twin screw extruder. Diamine I, Lot 2, molecular weight 5260, was also added in zone 1 of the extruder at a rate of 29.7 g/min (0.00565 mol/min). The screws were fully intermeshing double start 12 mm pitch elements rotating at 75 revolutions per minute. The temperature profile for each of the 120 mm zones was: zone 1—30° C.; zones 2 through 6—150° C.; zone 7—190° C.; zone 8— 220° C.; zone 9—220° C.; zone 10—180° C.; and endcap—170° C. The resultant extrudate was cooled in a water bath and collected. This polydimethylsiloxane polyurea segmented copolymer was solvent resistant, only swelling in tetrahydrofuran. The product had a Shore A hardness of 34. The inherent viscosity was not determinable as in other examples due to the insolubility of the product in tetrahydrofuran and chloroform.

In Example 32, polydimethylsiloxane polyurea segmented copolymer was prepared as in Example 1, except the diisocyanate was isophorone diisocyanate which was fed at a rate of 0.338 g/min (0.00152 mol/min), and Diamine A, Lot 3, molecular weight 5330, was injected at a rate of 8.0 g/min (0.00150 mol/min). The inherent viscosity of this material was 1.89 dUg. Physical properties of solution-cast films were: modulus—1.52 MN/m$^2$, tensile strength—3.61 MN/m$^2$, and elongation at break—650%.

In Comparative Example C3, 96.07 grams Diamine A, Lot 1, molecular weight 5280, were degassed in a 3-neck 1000 mL round bottom flask under heat and vacuum. An overhead mechanical stirrer was then added, the flask was purged with argon, and 800 mL of toluene were added. Isophorone diisocyanate (3.97 g) was added dropwise to the diamine/toluene solution over a two minute period. This solution was stirred rapidly during this addition. The viscosity increased during the addition of the diisocyanate; stirring of the solution continued for an additional two and one-half hours after addition of the diisocyanate. The polydimethylsiloxane polyurea segmented copolymer solution was then diluted with an additional 40 mL of 2-propanol and allowed to mix overnight. The copolymer solution was then poured from the flask into a Petri dish and allowed to dry to form a film. The product which had an NCO:NH$_2$ ratio of 0.98:1 had an inherent viscosity of 0.53, significantly less than that of Example 32.

Examples 33–36

In Example 33, polydimethylsiloxane polyurea segmented copolymer was produced on the same 18 mm extruder as the polydimethylsiloxane polyurea segmented copolymer of Example 1. Polydimethylsiloxane diamine (X-22-161A, Lot 409,073, molecular weight 1620, obtained from Shin-Etsu Silicones of America) was fed at a rate of 7.86 g/min (0.00485 mol/min) along with methylenedicyclohexylene-4,4'-diisocyanate at rate of 1.27 g/min (0.00485 mol/min) into zone three of the extruder. The screw speed was 57 revolutions per minute and the temperature profile was: zone 1—30° C.; zone 2—40° C.; zone 3— 58° C.; zone 4—150° C.; zone 5—190° C.; zones 6 to 8—220° C.; and endcap—220° C. The product had an NCO:NH$_2$ ratio of 1:1. Shore A hardness was 43.

In Example 34, polydimethylsiloxane polyurea segmented copolymer was prepared as in Example 33. Polydimethylsiloxane diamine (PS 510, molecular weight 2,630, obtained from Hüls America, Inc.) was fed at a rate of 7.93 g/min (0.00302 mol/min) together with dicyclohexylmethane-4,4'-diisocyanate at rate of 0.915 g/min (0.00349 mol/min) into zone four of the extruder. The screw speed was 57 revolutions per minute and the temperature profile was: zone 1—30° C.; zone 2—30° C.; zone 3—34° C.; zone 4—53° C.; zone 5—120° C.; zone 6— 180° C.; zone 7—200° C.; and zone 8 and endcap—220° C. This product had an NCO:NH$_2$ ratio of 1.16:1.

In Example 35, polydimethylsiloxane polyurea segmented copolymer was prepared as in Example 34 except the diisocyanate was fed at a rate of 0.167 g/min (0.000637 mol/min), and Diamine B, Lot 1, molecular weight 10,700, was fed at a rate of 6.20 g/min (0.000579 mol/min), into the fifth zone of the extruder. The screw speed was 75 revolutions per minute and the temperature profile was: zones 1 through 3—30° C.; zone 4—36° C.; zone 5—62° C.; zone 6—150° C.; zone 7—200° C.; and zone 8 and endcap—220° C. The product had an NCO:NH$_2$ ratio of 1.10:1. Shore A hardness was 16.

In Example 36, polydimethylsiloxane polyurea segmented copolymer was prepared as in Example 34, except the diisocyanate was fed at a rate of 0.0886 g/min (0.000338 mol/min), and Diamine C, molecular weight 22,300, was fed at a rate of 6.24 g/min (0.000280 mol/min), both into the fifth zone of the extruder. The screw speed was 75 revolutions per minute and the temperature profile was: zones 1 through 4—30° C.; zone 5—60° C.; zone 6—150° C.; zone 7—200° C.; and zone 8 and endcap—220° C. The NCO:NH$_2$ ratio of the product was 1.19:1. Shore A hardness was 15.

The polydimethylsiloxane polyurea segmented copolymers of Examples 33–36 were insoluble in common organic solvents such as tetrahydrofuran, chloroform, toluene, isopropanol, and mixtures thereof, yet all were extrudable, nearly clear in color, quite elastic, possessing a smooth surface, and had no oiliness to the touch. The insolubility indicates, at a minimum, the presence of very high molecular weight linear polymer; the potential exists for branched or crosslinked species. Consequently, none of the materials properties could be determined in the same manner as in the previous examples, but the polydimethylsiloxane polyurea segmented copolymers of Examples 33–36 materials were strong, elastic, and easily processed. High processing temperatures, good mixing, short residence times, and, optionally, high NCO:NH$_2$ ratios yield these strong, insoluble, processable materials.

Examples 37–41

In Example 37, Diamine A, Lot 1, molecular weight 5280, was injected at a rate of 40.2 g/min (0.00761 mol/min) into the second zone of a Leistritz 34 mm diameter 1200 mm long counter-rotating twin screw extruder and methylenedicyclohexylene-4,4'-diisocyanate was dripped into zone seven at a rate of 1.995 g/min (0.00761 mol/min). Double-start fully intermeshing screws were used throughout the entire length of the barrel, rotating at 50 revolutions per minute. The temperature profile for each of the 120 mm zones was: zone 120° C.; zones 2 through 6—50° C.; zone 7—75° C.; zone 8—130° C.; zone 9—160°; zone 10—190° C.; endcap—200° C. Vacuum was pulled on zone 9. The resultant polydimethylsiloxane polyurea segmented copolymer was extruded into a 1 cm diameter strand, cooled in air, and collected. Physical properties are shown in Table 7.

In Example 38, a polydimethylsiloxane polyurea segmented copolymer was prepared as in Example 37, except filmed silica (CAB-O-SIL™ M-7D, Cabot Corporation) was added at a rate of 2.22 g/min into zone 1 of the extruder, the screw speed was 100 revolutions per minute, and the temperature of zone 7 was 80° C.

In Example 39, a polydimethylsiloxane polyurea segmented copolymer was made as in Example 38, except calcium carbonate was added at a rate of 4.95 g/min into zone 1 of the extruder instead of fumed silica. The calcium carbonate had been dried in a vacuum oven at 90° C. for 1 hour immediately prior to addition into the extruder.

In Example 40, a polydimethylsiloxane polyurea segmented copolymer was prepared as in Example 39, except the calcium carbonate was added at a rate of 17.9 g/min.

In Example 41, a polydimethylsiloxane polyurea segmented copolymer was prepared as in Example 39, except carbon black (ELFTEX™ 8 GP-3199, available from Cabot Corporation) was added at a rate of 4.72 g/min instead of calcium carbonate. The carbon black had been dried in a vacuum oven at 90° C. for 2 hours immediately prior to addition into the extruder.

The Shore A hardness and tensile properties for the polydimethylsiloxane polyurea segmented copolymer of Example 37 and for the filled polydimethylsiloxane polyurea segmented copolymers of Examples 38–41, each of which had an $NCO:NH_2$ ratio of 1:1, were determined and are set forth in Table 7.

TABLE 7

| Ex. | Additive | Shore A hardness | Modulus (MN/m$^2$) | Maximum Stress (MN/m$^2$) | Elongation at break (%) |
| --- | --- | --- | --- | --- | --- |
| 37 | None | 45 | 1.39 | 3.83 | 630 |
| 38 | 5.0 wt. % fumed silica | 40 | 1.74 | 2.02 | 410 |
| 39 | 10.5 wt. % calcium carbonate | 42 | 1.43 | 1.96 | 681 |
| 40 | 29.7 wt. % calcium carbonate | 50 | 1.52 | 1.34 | 502 |
| 41 | 10.0 wt. % carbon black | 45 | 2.26 | 3.27 | 420 |

Example 42

In Example 42, a polytrifluoropropylmethyldimethylsiloxane polyurea segmented copolymer was prepared as in Example 5 except the diamine was Diamine G, 5,440 molecular weight, in which 95 mol % of the organic groups attached to the silicone were methyl and 5 mol % were trifluoropropyl. This fluorinated diamine was fed at a rate of 8.0 g/min (0.00147 mol/min), and methylenedicyclohexylene-4,4'-diisocyanate was fed at a rate of 0.403 g/min (0.00154 mol/min). The inherent viscosity of the resulting product was 0.64 g/dL, the modulus was 1.08 MN/m$^2$, the tensile strength was 2.38 MN/m$^2$, and the elongation at break was 710%.

Example 43

In Example 43, a polydimethyldiphenylsiloxane polyurea segmented copolymer was produced using the extruder and screw design of Example 34. The diamine, Diamine J, Lot 1, was a polydiphenyldimethylsiloxane diamine having a number average molecular weight of 9,330. This diamine and methylenedicyclohexylene-4,4-diisocyanate were fed into zone one of the extruder, the diamine was fed at a rate of 6.56 g/min (0.000703 mol/min) and the diisocyanate was fed at a rate of 0.204 g/min (0.000779 mol/min). The screw speed was 75 revolutions per minute and the temperature profile was: zone 1— 22° C.; zone 2—22° C.; zone 3—50° C.; zone 4—100° C.; zone 5—140° C.; zones 6 and 7—180° C.; zone 8 and endcap—220° C. The product which had a $NCO:NH_2$ ratio of 1.11: 1, had a Shore A hardness of 16. The product was insoluble in tetrahydrofuiran, chloroform, and mixtures of toluene and isopropanol due to the high processing temperature and high $NCO:NH_2$ ratio.

Example 44

In Example 44, a polydimethyldiphenylsiloxane polyurea segmented copolymer was produced using the extruder and screw design of Example 1. A blend of 75 parts by weight Polydimethylsiloxane Diamine B, Lot 1, molecular weight 10,700, and 25 parts by weight Diamine J, Lot 2, poly (dimethyldiphenyl siloxane)diamine, molecular weight 9,620; was prepared. The number average molecular weight of this blend was 10,400. This diamine mixture and dicyclohexylmethane-4,4-diisocyanate were fed into the fifth zone of the extruder, the diamine was fed at a rate of 8.72 g/min (0.000838 mol/min) and the diisocyanate was fed at a rate of 0.217 g/min (0.000828 mol/min). The screw speed was 50 revolutions per minute and the temperature profile was: zones 1 through 5—22° C.; zone 6—80° C.; zone 7—150° C.; zone 8—170° C.; and endcap—220° C. The product which had a $NCO:NH_2$ ratio of 0.99, had a Shore A hardness of 32.

Example 45

In Example 45, a polydimethylsiloxane polyurea segmented copolymer was prepared in a Haake TW-100 conical twin screw extruder, available from Haake, Inc., Paramus, N.J., which had 32–26 mm diameter fully intermeshing screws (No. 5572211). Diamine A, Lot 1, molecular weight 5280, was fed at a rate of 7.36 g/min (0.00139 mol/min) into the feed throat of the extruder Methylenedicyclohexylene-4,4'-diisocyanate was also fed into the feed throat of the extruder at a rate of0.387 g/min (0.00150 mol/min). The screws were rotating at 75 revolutions per minute. The extruder temperature profile was: feed throat—20° C., zone 1—84° C., zone 2—150° C., and zone 3—60° C.

A three-layer construction was prepared using a CLO-EREN™ 5-layer coextrusion feedblock. The endcap of the Haake extruder and the necktube feeding into the feedblock were maintained at 160° C. The polydimethylsiloxane polyurea segmented copolymer was extruded as one of the outer layers. The middle layer was an ethylene vinyl acetate (BYNEL™ CXA 2002, available from DuPont Chemical Co.) processed at 227 g/min through a Leistritz 34 mmn diameter, 42:1 length to diameter ratio, co-rotating twin screw extruder. The third layer was a polypropyleneethylene copolymer (SHELL™ 7CO5N, available from Shell Chemical Co.) processed at a total of 530 g/min by two extruders in parallel: a BERLYN™ 5.08 cm (2.00 in), 30:1 length to diameter ratio single screw extruder and a Killion 3.18 cm (1.25 in) 24:1 length to diameter single screw extruder. The four polymer streams were each fed into separate ports of the CLOEREN™ feedblock configured with a selector plug to produce a layered stream. A 25.4 cm (10.0 in) die was used to cast the coextruded construction into a film. Both the feed block and die were operating at 177° C. The film was cast onto a chrome roll with a rubber nip at 68.9 m/min to form a release film 56 micrometers thick. Three pressure-sensitive adhesive tapes: #371 box sealing tape, #810 Scotch Brand Magic Tape®, and #232 masking tape, each available from 3M Co., St. Paul, Minn., were placed against the polydimethylsiloxane polyurea segmented copolymer release surface and rolled 4 times with a 1.13 kg. (2.5 lb.) roller. Peel values were determined at a rate of 229 cn/min (90 in/min) and 180° peel angle after samples were maintained for at least 4 hours at 50% relative humidity and 22.2° C. The peeled tape was then placed on glass which had been cleaned thoroughly with ethyl acetate. Readhesion values to the glass were then determined using the same procedure. The readhesion values to glass were compared to adhesions to glass of a strip of the same tape which had not contacted the coextruded release material. The percent retention in readhesion to glass of the tape which had contacted the release layer compared to the adhesion of the tape which had not contacted the release layer was calculated. The initial peel values and the percent retention in readhesion are shown in Table 8.

TABLE 8

|  | Peel value (g/in) | Readhesion Retention |
|---|---|---|
| #371 Box Sealing Tape | 17 | 82% |
| #810 Scotch Magic Tape | 21 | 79% |
| #232 Masking Tape | 38 | 96% |

Example 46

In Example 46, tetramethyl-m-xylylene diisocyanate was fed into the fifth zone of an 18 mm co-rotating twin screw extruder having a 40:1 length:diameter ratio (available from Leistritz Corporation, Allendale, N.J.) at a rate of 0.0753 g/min (0.000309 mol/min). The extruder had double-start fully intermeshing screws throughout the entire length of the barrel, rotating at 100 revolutions per minute. Polydimethylsiloxane Diamine C, molecular weight 22,300, was injected into the fifth zone at a rate of 6.24 g/min (0.000280 mol/min). The temperature profile for each of the 90 mm long zones was: zones 1 through 4—30° C.; zone 5— 50° C.; zone 6—120° C.; zone 7—150° C.; zone 8—180° C.; and endcap—180° C. The resultant polydimethylsiloxane polyurea segmented copolymer was extruded into a 3 mm diameter strand, cooled in water, and pelletized. The pelletized material was then fed into a 1.91 diameter (¾ inch) single screw extruder (Haake) rotating at 85 revolutions per minute. The temperature profile of the extruder was: zone 1—163° C.; zone 2—171° C.; and zone 3—179° C. Necktube and die temperatures were 179° C. The extrudate was cast from this 12.7 cm die into a 0.3 mm thick film. Peel testing was performed as in Example 45 with the results set forth in Table 9.

TABLE 9

|  | Peel value (g/in) | Readhesion Retention |
|---|---|---|
| #371 Box Sealing Tape | 60 | 70% |
| #810 Scotch Magic Tape | 24 | 98% |
| #232 Masking Tape | 89 | 79% |

Example 47

In Example 47, a polydimethylsiloxane polyurea segmented copolymer was prepared in a 7.62 cm (3.00 in) inside diameter pin mixer with a mixing length of 20 cm (8 in). This cylindrical continuous mixer had a multi-impeller which rotated between stationary pins attached to the inside of the barrel. The pins were positioned radially at 900 intervals along the length of the mixer both on the rotating shaft and inside the barrel. The forwarding pressure for the reacting material was produced via injection pumps for the two reactants. Polydimethylsiloxane Diamine A, Lot 1, 5280 molecular weight, was injected at the rear of the pin mixer at a rate of 157 g/min (0.0297 mol/min) and at a temperature of 117° C. Ten cm down the barrel of the pin mixer, methylenedicyclohexylene-4,4'-diisocyanate was injected at a rate of 7.79 g/min (0.0297 mol/min). The mixer barrel and exit tube temperatures were set at 180° C. The impeller rotation rate was 100 revolutions per minute. The resultant polydimethylsiloxane polyurea segmented copolymer had an inherent viscosity of 0.36 dL/g, a modulus of 0.77 $MN/m^2$, a tensile strength of 0.90 $MN/m^2$, an elongation at break of 490%, and a Shore A hardness of 20.

Example 48

In Example 48, a polydimethylsiloxane polyurea segmented copolymer was prepared using the same pin mixer configuration as Example 47. Polydimethylsiloxane Diamine A, Lot 1, 5280 molecular weight, was heated to 160° C. and injected at a rate of 166 g/min (0.0314 mol/min) and tetramethyl-m-xylylene diisocyanate was injected at a rate of 7.69 g/min (0.0315 mol/min) as in Example 47. The impeller rotation was 125 revolutions per minute. The resultant polydimethylsiloxane polyurea segmented copolymer had an inherent viscosity of 0.43 dL/g, a modulus of 2.71 $MN/m^2$, a tensile strength of 1.48 $MN/m^2$, an elongation at break of 380%, and a Shore A hardness of 46.

Example 49

In Example 49, a polydimethylsiloxane polyurea segmented copolymer was produced by injecting tetramethylm-xylylene diisocyanate at a rate of 0.462 g/min (0.00189 mol/min) into the vent port (zone 2) of a C.W. Brabender (Type 302) 1.91 cm (0.75 in) diameter single screw extruder driven with a Haake Rheodrive 5000 motor unit. Polydimethylsiloxane Diamine A, Lot 1, molecular weight 5280. was also injected into this zone as a separate stream, at rate of 9.99 g/min (0.00189 mol/min). The temperature profile of the extruder was: feed zone—water cooled; zone 1—115° C.; zone 2, 3, and endcap—180° C. The screw was rotating at 100 revolutions per minute. The resultant material was clear and had an inherent viscosity of 0.34 dL/g.

Examples 50–57

Examples 50–57 illustrate the use of polyisocyanates in the process of the present invention to make polydiorganosiloxane polyurea segmented copolymers.

In Example 50, Polydimethylsiloxane Diamine A, Lot 4, 5,310 molecular weight, was fed at a rate of 59.9 g/min (0.0113 mol/min) into zone 8 of a Berstorff 40 mm diameter 1600 mm length co-rotating twin screw extruder. A mixture of 10 parts by weight DESMODUR N-3300 (polyisocyanate with NCO equivalent weight of 195, Bayer, Pittsburgh, Pa. 15205) and 90 parts by weight methylenedicyclohexylene-4,4'-diisocyanate was fed at a rate of 3.20 g/min (0.0236 equivalents NCO/min) into zone 8 to provide an NCO:$NH_2$ ratio of 1.00:1.00. The diisocyanate feed line was lightly brushing the screw threads. Double start filly intermeshing screws, rotating at 100 revolutions per minute, were used throughout the entire length of the barrel. The temperature profile for each of the 160 mm zones was: zones 1 through 7 set at 25° C.; zone 8—60° C.; zone 9—120° C.; zone 10—182° C.; endcap and meltpump—180° C. The resultant polydimethylsiloxane polyurea segmented copolymer was extruded into a 3 mm diameter strand, cooled in air, and collected. The product had an inherent viscosity of 0.63.

In Example 51, polydimethylsiloxane polyurea segmented copolymer was prepared as in Example 50. Polydimethylsiloxane Diamine D, Lot 2, molecular weight 34,800, was fed at a rate of 61.0 g/min (0.00175 mol/min) and the polyisocyanate mixture was fed at a rate of 0.475 g/min (0.00351 equivalents NCO/min) into zone 8 to provide an NCO:$NH_2$ ratio of 1.00:1.00. The product had an inherent viscosity of 1.20.

In Example 52, polydimethylsiloxane polyurea segmented copolymer was prepared as in Example 51. A mixture of 10 parts by weight MONDUTR 489 (polyisocyanate with NCO equivalent weight of 137, Bayer, Pittsburgh, Pa. 15205) and 90 parts by weight methylenedicyclohexylene-4,4'-diisocyanate was fed at a rate of 0.462 g/min (0.00351 equivalents NCO/min) into zone 8 to provide an NCO:$NH_2$ ratio of 1.00:1.00. The product had an inherent viscosity of 1.12.

In Example 53, polydimethylsiloxane polyurea segmented copolymer was prepared as in Example 51. A mixture of 10 parts by weight MONDUR 489 (Bayer, Pittsburgh, Pa. 15205) and 90 parts by weight methylenedicyclohexylene-4,4'-diisocyanate was fed at a rate of 0.483 g/min (0.00367 equivalents NCO/min) into zone 8 to provide an NCO:$NH_2$ ratio of 1.05:1.00. The product had an inherent viscosity of 1.03.

In Example 54, polydimethylsiloxane polyurea segmented copolymer was prepared as in Example 50. Polydimethylsiloxane Diamine F, molecular weight 105,000, was fed at a rate of 60.1 g/min (0.000572 mol/min) and the DESMODUR N-3300/methylenedicyclohexylene-4,4'-diisocyanate mixture was fed at a rate of 0.155 g/min (0.00114 equivalents NCO/min) into zone 8 to provide an NCO:$NH_2$ ratio of 1.00:1.00. The product had an inherent viscosity of 1.22.

In Example 55, polydimethylsiloxane polyurea segmented copolymer was prepared as in Example 54. The polyisocyanate mixture was fed at a rate of 0.171 g/min (0.00126 equivalents NCO/min) into zone 8 to provide an NCO:$NH_2$ ratio of 1.10:1.00. The product had an inherent viscosity of 1.36.

In Example 56, polydimethylsiloxane polyurea segmented copolymer was prepared as in Example 54. The polyisocyanate mixture was fed at a rate of 0.186 g/min (0.00137 equivalents NCO/min) into zone 8 to provide an NCO:$NH_2$ ratio of 1.20:1.00. The product had an inherent viscosity of 1.64.

In Example 57, a filled polydimethylsiloxane polyurea segmented copolymer was prepared as in Example 50.3 parts by weight Polydimethylsiloxane Diamine D, Lot 2, molecular weight 34,800, was mixed with 4 parts by weight $Al_2O_3$ powder and fed into zone 8 at a rate of 103.7 g/min (0.00128 mol diamine/min). Methylenedicyclohexylene-4,4'-diisocyanate was fed at a rate of 0.335 g/min (0.00128 mol/min) into zone 8 to provide an NCO:$NH_2$ ratio of 1.00:1.00. The product had a Shore A hardness of 17. Thermal conductivity tested with ASTM method C518 was 0.17 W/m ° K. A similarly made composition without filler had a thermal conductivity of 0.10 W/m ° K.

Examples 58–60 and Comparative Example C4

In Example 58, a Berstorff 25 mm diameter corotating twin screw extruder having a 29.5:1 length diameter ratio was used with an open feed port at zone 1 and a pressure injection feed at zone 3. Double start fully intermeshing screws, rotating at 100 revolutions per minute, were used throughout the entire length of the barrel with 3 sets of 25 mm length kneading blocks located at the end of zone 4. The temperature profile for each of the zones was: zone 1—30° C.; zone 2— 75° C.; zone 3—100° C.; zone 4—125° C.; zone 5—150° C.; zone 6—175° C.; endcap and meltpump— 190° C.; and necktube—200–220° C. The feedstock reagents were maintained under a nitrogen atmosphere.

Polydimethylsiloxane Diamine A, Lot 1, molecular weight 5280, was fed at a rate of 12.11 g/min (0.00229 mol/min) into the first part of zone 1 and 3-isocyanatomethyl-3,5,5-trimethylcyclohexyl isocyanate (isophorone diisocyanate, obtained from Sigma-Aldrich Corporation) was fed at a rate of 29.39 g/min (0.132 mol/min) into the second part of zone 1. A blend of 2.4 parts by weight Jeffamine™ D400 polyoxypropylenediamine (obtained from Huntsman Corporation, titrated molecular weight 515 g/mol for Lot #CP5205) and 1 part by weight Dytek A™ (2-methyl-1,5-pentanediamine obtained from DuPont, titrated molecular weight 120 g/mol for Lot #SC9403021 1) was injected at zone 3 at a rate of 34.17 g/min (0.130 mol/min). The ratio of NCO:$NH_2$ was 1.00:1. The resultant polydimethylsiloxane polyurea segmented copolymer was extruded as a 2.5 mm diameter strand into an ice $H_2O$ bath and pelletized. The product had an inherent viscosity as measured in DMF of 1.21 dL/g and a bimodal distribution by GPC with overall $M_n$=3.4×$10^4$.

In Examples 59 and 60, polydimethylsiloxane polyurea segmented copolymers were prepared and tested as in Example 58 except the feed rates of the diisocyanate were 30.86 g/min (0.139 mol/min) and 32.33 g/min (0.146 mol/min), respectively. Thus the ratio of NCO:$NH_2$ for these compositions was 1.05:1 and 1.10:1. These products had inherent viscosities as measured in DMF of 1.74 dL/g (bimodal distribution by GPC with overall $M_n$=5.1×$10^4$) for the former and 2.91 dL/g (bimodal distribution by GPC with overall $M_n$=7.1×$10^4$) for the latter.

In Comparative Example C4, 16.0 grams Polydimethylsiloxane Diamine A, Lot 5, molecular weight 5270, which had been degassed with warming under vacuum and then purged with nitrogen were weighed into a screw capped jar. To this was added 29.0 g Jeffamine™ D-400 polyoxypropylenediamne (obtained from Huntsman Corporation, titrated molecular weight 452 g/mol for Lot #CP5131) and 13.8 g Dytek A™ (2-methyl-1,5-pentanediamine obtained from DuPont, molecular weight 116 g/mol for Lot #SC941013J1) and then isopropyl alcohol sufficient to yield a final 30% solids solution. This diamine solution was shaken well and 3-isocyanatomethyl-3,5,5-trimethylcyclohexyl isocyanate (isophorone duisocyanate, obtained from Sigma-Aldrich Corporation), 41.2 grams were added all at once to afford a ratio of NCO:$NH_2$ of 1.00:1.00. This reaction solution was immediately mixed via vigorous agitation. An immediate increase in viscosity was noted and the reaction solution was further mixed via a mechanical shaker for at least 2 hours. The polydimethylsiloxane polyurea segmented copolymer solution was then poured into a tray and the solvent evaporated to yield a product with an inherent viscosity as measured in DMF of 1.57 dL/g. Examples 58–60 and Comparative Example C4 demonstrate that NCO:$NH_2$ ratios greater than 1 can yield inherent viscosities greater than a similar solvent made composition.

Example 61

In Example 61, a Berstorff 40 mm diameter corotating twin screw extruder with a 40:1 length diameter ratio was utilized with an open feed port at zone 5 and at zone 8. Double start fully intermeshing screws, rotating at 100 revolutions per minute, were used from zone 5 through zone 10 with kneading blocks and reverse elements added in zones 6–7 and zone 9–10. The temperature profile for each of the 160 mm zones was: zone 1 20° C.; zone 2 through zone 5—30° C.; zone 6— 50° C.; zone 7—75° C.; zone 8—100° C.; zone 9—125° C.; zone 10—150° C.; endcap— 150° C.; and meltpump—170° C. Polydimethylsiloxane Diamine A, Lot 1, molecular weight 5280, was fed at a rate of 1.84 g/min (0.000348 mol/min) into the first part of zone 5. Methylenedicyclohexylene-4,4'-diisocyanate (DESMODUR W, obtained from Miles Laboratory) was fed at the last part of zone 5 at a rate of 7.46 g/min (0.0285 mol/min). A blend of 15.3 parts by weight Jeffamin™ ED-2001 polyoxyalkylenediamine (obtained from Huntsman Corporation, titrated molecular weight 2155 g/mol) and I part by weight Dytek EP™ (1,3-diaminopentane, obtained from DuPont, molecular weight 102 g/mol) was fed into zone 8 at a rate of 27.03 g/min (0.0281 mol/min). The ratio of NCO:$NH_2$ was 1.00:1. The polydimethylsiloxane polyurea segmented copolymer was extruded as a strand to yield a product with $M_n$=7.0×$10^4$ by GPC analysis.

The Moisture Vapor Transmission Rate—Upright ($MVTR_{up}$) was measured with use of a modified ASTM E 96–80 technique. The polydimethylsiloxane polyurea segmented copolymer was dissolved at 20% solids in isopropyl alcohol and cast as a film. A 35 mm diameter sample of the 0.025 cm thick film was sandwiched between the adhesive surfaces of two axially aligned foil adhesive rings having 2.54 cm diameter holes. The sample was pulled to ensure a flat, wrinkle-free and void-free foilsample/foil laminate. A 4 oz (0.14L) glass jar was filled with distilled water and fitted with a screw cap having a 3.8 cm diameter hole concentrically aligned with a rubber washer having a 4.445 cm outside diameter and a 2.84 cm inside diameter. The foil/sample/foil laminate was concentrically positioned on the rubber washer and the sample-containing sub-assemble was screwed loosely onto the jar. The sample in the assembly was then equilibrated in a 40° C., 20% relative humidity chamber for 4hours and then removed and weighed to the nearest 0.01 gram ($W_1$). The cap was then screwed tightly onto the jar without bulging the sample and the assembly was immediately returned to the chamber for 18 hours, then removed and weighed to the nearest 0.01 gram ($W_2$). The $MVTR_{up}$ of the laminated sample was then calculated according to the formula:

$$MVTR_{up}=(W_1-W_2)(4.74\times10^4)/t$$

where t is defined as the time period in hours between $W_1$ and $W_2$. The value reported then is the average of three sample runs. This polydimethylsiloxane polyurea segmented copolymer afforded a $MVTR_{up}$ of 5839 g/$m^2$/24h.

Example 62 and Comparative Example C5

In Example 62, polydimethylsiloxane polyurea segmented copolymers were prepared with the extrusion process described in Example 58 except that the Polydimethylsiloxane Diamine A, Lot 5, molecular weight 5270, was fed at a rate of 12.11 g/min (0.00230 mol/min) into the first part of zone 1 and methylenedicyclohexylene-4,4'-diisocyanate (DESMODUR W, obtained from Miles Laboratory) was fed at a rate of 33.38 g/min (0.127 mol/min) into the second part of zone 1. A blend of 2.9 parts by weight Jeffamine™ D-400 polyoxypropylenediamine (obtained from Huntsman Corporation, titrated molecular weight 515 g/mol for Lot #CP5205) and 1 part by weight Dytek A™ (2-methyl-, 1,5-pentanediamine obtained from DuPont, titrated molecular weight 120 g/mol for Lot #SC9403021 1) was injected at zone 3 at a rate of 32.51 g/min (0.1165 mol/min). The ratio of NCO:$NH_2$ was 1.07:1. The resultant polydimethylsiloxane polyurea segmented copolymer was extruded as a 2.5 mm diameter strand into an ice $H_2O$ bath and pelletized. The resultant product was not fully soluble in common organic solvents indicative of a significant high molecular weight fraction, thus neither inherent viscosity nor GPC measurements were performed.

In comparative Example C5, 80.0 grams Polydimethylsiloxane Diamine A, Lot 5, molecular weight 5270, that had been degassed with warming under vaccum and then purged with nitrogen were weighed into a screw capped jar. To this was added 160.0 grams Jeffamine™ D-400 polyoxypropylenediamine (obtained from Huntsman Corporation, titrated molecular weight 452 g/mol for Lot #CP5131) and 50.11 grams Dytek A™ (2-methyl-1,5-pentanediamine obtained from DuPont, molecular weight of 116 g/mol for Lot #SC941013J1) and then isopropyl alcohol sufficient to yield a final 20% solids solution. This solution was shaken well and methylenedicyclohexylene-4,4'-diisocyanate (DESMODUR W, obtained from Miles Laboratory), 209.89 grams were added all at once to afford an NCO:$NH_2$ ratio of 1.00:1. This reaction solution was immediately mixed via vigorous agitation. An immediate increase in viscosity was noted and a cloudy reaction solution resulted from the forming polymer. Continued mixing via a mechanical shaker yielded both a final reaction solution that was cloudy and a reaction vessel that was coated with an essentially insoluble residue. Thus in contrast to the process detailed in Example 62, this solvent based methodology does not lend itself well to the preparation of polydimethylsiloxane polyurea segmented copolymers of the composition described.

Example 63

In Example 63, a Berstorff 25 mm diameter corotating twin screw extruder was used as in Example 58 with the following modifications. The screw, operating at 50 revolutions per minute, was constructed with double start fully intermeshing screws used in combination with partially intermeshing screws with 3 sets of 25 mm length kneading blocks located between zone 2 and 3 and at the end of zone 4 with a reverse element located after the kneading blocks in zone 4. Open feed ports were located at zone I and zone 3. The temperature profile for each of the zones was: zone 1—30° C.; zone 2 an 3—75° C.; zone 4—100° C.; zone 5 and 6—120° C.; endcap, meltpump, and necktube—120° C. The feedstock reagents were maintained under a nitrogen atmosphere. Polydimethylsiloxane Diamine A, Lot 1, molecular weight 5280, was fed at a rate of 0.38 g/min (0.0000720 mol/min) into the first part of zone 1 and 3-isocyanatomethyl-3,5,5-trimethyicyclohexyl isocyanate (isophorone diisocyanate, obtained from Sigma-Aldrich Corporation) was fed at a rate of 1.77 g/min (0.00797 mol/min) into the second part of zone 1. A blend of 25.2 parts by weight Jeffamine™ DU-700 polyoxypropylenediamine (obtained from Huntsman Corporation, molecular weight 927 g/mol) and 1 part by weight Dytek A™ (2-methyl-1,5-pentanediamine obtained from DuPont, molecular weight 116 g/mol) was fed into zone 3 at a rate of 5.51 g/min (0.00753 mol/min). The ratio of NCO:$NH_2$ was 1.05:1.

A three-layer construction was prepared with use of a CLOEREN™ 3-layer coextrusion feedblock fitted with an A-B-C selector plug and heated at 150–170° C. The polydimethylsiloxane polyurea segmented copolymer was extruded as an outer layer on the cast roll (chrome at 18° C.) at a rate of 7.6 g/min. The core layer was a blend of 20 parts by weight ethylene-acrylic acid copolymer (DOW Primacor™ 3440) and 80 parts by weight polypropylene (EXXON PP 3445) processed at 605 g/min through a BERLYN™ 5.08 cm (2.00 inch), 30:1 length to diameter ratio, single screw extruder. The base layer was a polypropylene (FINA PP 3576X) processed at 189 g/min through a Leistritz 34 mm diameter, 42:1 length to diameter ratio, co-rotating twin screw extruder. The three polymer streams were each fed into separate ports of the CLOEREN™ feedblock and a 45.7 cm (18.0 inch) die was used to cast the coextruded construction onto the chrome chill roll at 38.1 m/min to afford a 58.4 micrometer release film. These films were then tested with a series of pressure-sensitive adhesive tapes (obtained from 3M) as in Example 45 with the following modifications. The tapes were placed against the polydimethylsiloxane polyurea segmented copolymer release surface and rolled 4 times with a 2.0 kg (4.5 lb) roller and conditioned at least 4 hours at 50% relative humidity and 21.1° C. The readhesion retention values were measured with use of glass that had been cleaned thoroughly with isopropyl alcohol, heptane, and methyl ethyl ketone applied in that order. The initial peel values (N/dm) and retention in readhesion measured (%) were: #315 Monta (24 N/dm and 91%); #375 Scotch™ Box Sealing Tape (3.9 N/dm and 95%/o); and #850 Scotch™ Book Tape (9.7 N/dm and 83%).

Example 64

In Example 64, the same Berstorff 25 mm diameter corotating twin screw extruder from Example 58 was used with the modifications discussed herein. A dual injection port was used at zone 1 and a single injection port at both zones 3 and 4. Double start fully intermeshing screws, rotating at 125 revolutions per minute, were used throughout the entire length of the barrel with 2 sets of 25 mm length kneading blocks located at the end of zone 5. Polydimethylsiloxane Diamine C, Lot 1, molecular weight 22,300, was injected at a rate of 11.35 g/min (0.000509 mol/min) into the first part of zone 1 and a blend of 60 parts by weight methylenedicyclohexylene-4,4'-diisocyanate (DESMODUR W, obtained from Miles Laboratory) and 40 parts by weight tetramethyl-m-xylylene diisocyanate (obtained from Cytec) was injected at a rate of 30.85 g/min (0.121 mol/min) into the second part of zone 1. Jeffamine™ D-400 polyoxypropylenediamine (obtained from Huntsman Corporation, molecular weight 466 g/mol for Lot #2828566) was injected at a rate of 24.97 g/min (0.0536 mol/min) into zone 3. Dytek A™ (2-methyl-1,5-pentanediamine obtained from DuPont, molecular weight of 116 g/mol for Lot #SC950419J01)) was injected into zone 4 at a rate of 7.87 g/min (0.0678 mol/min). The resultant polydimethylsiloxane polyurea segmented copolymer of NCO:$NH_2$ ratio 0.99:1, was extruded as a 2.5 mm diameter strand into an ice $H_2O$ bath and pelletized to afford a product with $M_n$=5.9×10$^4$ by GPC analysis.

This polydimethylsiloxane polyurea segmented copolymer was tested for release properties either after being solvent coated (2.5% solids in isopropyl alcohol) onto polypropylene or subsequent to its coextrusion with a polypropylene (7C05N)/ethylene-acrylic acid copolymer (Dow Primacor™ 3440) blend. A modified version of PSTC-5 peel adhesion test was carried out in a constant temperature (21° C.) and humidity (50% relative humidity)

room with use of a constant rate Instron™ tensile tester. The film test sample was securely adhered to a 2"×5" (5.1 cm×12.7 cm) steel panel using double-coated adhesive tape. A 1" (2.54 cm) wide strip of pressure sensitive adhesive tape (SIS based block copolymer hotmelt PSA—52% Kraton™ 4433, 47% Wingtack+™, 1% ShellFlex™ oil) was adhered to the release surface of the test sample and rolled down with two passes of a 4.5 lb (2000 g) hard rubber roller. The free end of the tape was then clamped in an Instron™ and peeled at a 90° angle from the test sample surface at a rate of 12 in/min (30.5 cm/min). The reported results represent the average of 2 to 4 independent measurements. The polydimethylsiloxane polyurea segmented copolymer described in this example afforded initial peel force values for the solvent coated of 2.9 N/dm and for the coextruded film of 3.7 N/dm.

Example 65

In Example 65, a polydimethylsiloxane polyurea segmented copolymer was prepared as in Example 61 except for the following modifications. The methylenedicyclohexylene-4,4'-diisocyanate (DESMODUR W, obtained from Miles Laboratory) was fed at a rate of 6.71 g/min (0.0256 mol/min) into the last part of zone 5. A blend of 52.1 parts by weight Jeffamine™ DU-700 polyoxyalkylenediamine (obtained from Huntsman Corporation, titrated molecular weight 927) and 1 part by weight Dytek EP™ (1,3-diaminopentane, obtained from DuPont, molecular weight 102) was fed into zone 8 at a rate of 27.03 g/min (0.0336 mol/min). Further, a fourth feedstream was introduced into zone 8 with tetramethyl-m-xylylene diisocyanate (available from Cytec) fed at a rate of 2.09 g/min (0.00857 mol/min). The polydimethylsiloxane polyurea segmented copolymer of NCO:NH$_2$ ratio 1.01:1, was extruded as a strand to yield a product with M$_n$=6.0×10$^4$ by GPC analysis.

Example 66

In Example 66, a Berstorff 25 mm diameter corotating twin screw extruder was used as in Example 58 with the following modifications. The screw, operating at 100 revolutions per minute, was constructed with double start fully intermeshing screws used in combination with partially intermeshing screws with one set of 25 mm length kneading blocks located at the start of zone 4 and three sets located at the end of zone 5. The temperature profile for each of the zones was: zone 1—30° C.; zone 2—75° C.; zone 3—100° C.; zone 4—125° C.; zone 5— 150° C.; zone 6—175° C.; endcap and meltpump—175° C. and necktube—190° C. The feedstock reagents were maintained under a nitrogen atmosphere. Polydimethylsiloxane Diamine A, Lot 1, 5280 molecular weight was fed at a rate of 4.84 g/min (0.000917 mol/min) into the first part of zone 1 and tetramethyl-m-xylylene diisocyanate (obtained from Cytec) was fed at a rate of 3.19 g/min (0.0131 mol/min) into the second part of zone 1. Jeffamine™ D-4000 polyoxypropylenediamine (obtained from Huntsman Corporation, titrated molecular weight 4660 g/mol for Lot #513-1-0393-0594) was injected at 29.09 g/min (0.00624 mol/min) into zone 3. And Dytek A™ (2-methyl-1,5 -pentanediamine obtained from DuPont, titrated molecular weight 117 g/mol for Lot #SC94030211) was injected into zone 4 at a rate of 0.687 g/min (0.00587 mol/min). The resultant polydinethylsiloxane polyurea segmented copolymer of NCO:NH$_2$ ratio 1.00:1, was extruded as a strand to yield a product with M$_n$=5.9×10$^4$ by GPC analysis.

Example 67

In Example 67, the polydimethylsiloxane polyurea segmented copolymer was prepared as in Example 64 with the following exceptions. Polydimethylsiloxane Diamine C, Lot 2, 17,000 molecular weight, was injected at a rate of 11.35 g/min (0.000668 mol/min) into the first part of zone 1 and a blend of 80 parts by weight tetramethyl-m-xylylene diisocyanate (obtained from Cytec) and 20 parts by weight methylenedicyclohexylene-4,4'-diisocyanate (DESMODUR W, obtained from Miles Laboratory) was injected at a rate of 39.37 g/min (0.159 mol/min) into the second part of zone 1. Jeffamine™ D-400 polyoxypropylenediamine (obtained from Huntsman Corporation, molecular weight of 466 g/mol for Lot #5J708)) was injected at a rate of 7.57 g/min (0.0162 mol/min) into zone 3. Dytek A™ (2-methyl-1,5-pentanediamine obtained from DuPont, molecular weight of 116 g/mol for Lot #SC950512J01)) was injected into zone 4 at a rate of 16.78 g/min (0.145 mol/min). The resultant polydimethylsiloxane polyurea segmented copolymer of NCO:NH$_2$ ratio 0.93:1, was extruded as a 2.5 mm diameter strand into a Fluorinert™/dry ice bath and pelletized to afford a product with an inherent viscosity as measured in dimethylformamide of 0.17 dL/g.

Example 68

In Example 68, a polydimethylsiloxane polyurea segmented copolymer was prepared as in Example 61 except for the following modifications. The methylenedicyclohexylene-4,4'-diisocyanate (DESMODUR W, obtained from Miles Laboratory) was fed at a rate of 8.95 g/min (0.0342 mol/min) into the last part of zone 5. The Jeffamine™ DU-700 polyoxyalkylenediamine (obtained from Huntsman Corporation, titrated molecular weight 927) was fed into zone 8 at a rate of 27.03 g/min (0.0292 mol/min). The polydimethylsiloxane polyurea segmented copolymer of NCO:NH$_2$ ratio 1.16:1, was extruded as a strand to yield a product with M$_n$=5.7×10$^4$ by GPC analysis.

Example 69

In Example 69, a polydimethylsiloxane polyurea segmented copolymer was prepared in an 18 mm Leistritz as in Example 1 with the following modifications. The temperature profile for each of the 90 mm zones was: zone 1 to 3—30° C.; zone 4—50° C.; zone 5—80° C.; zone 6—150° C.; zone 7—180° C.; zone 8— 190° C.; and endcap—195° C. A 1:1 molar blend of Polydimethylsiloxane Diamine E, Lot 2, molecular weight 50,200 and Dytek A™ (2-methyl-1,5-pentanediamine available from DuPont) was fed at a rate of 6.16 g/min (0.000242 mol/min) into zone 1 of the extruder with a screw that was rotating at 75 revolutions per minute. Methylenedicyclohexylene-4,4'-diisocyanate (DESMODUR W, obtained from Miles Laboratory) was fed into zone 4 at a rate of 0.0635 g/min (0.000242 mol/min). The resultant polydimethylsiloxane polyurea segmented copolymer of NCO:NH$_2$ ratio 1.00:1, was extruded into a 3 mm diameter strand, cooled in air, and collected. The resultant product was not fully soluble in common organic solvents indicative of a significant high molecular weight fraction, thus neither inherent viscosity nor GPC measurements were performed. A film of 1 mm thickness was hot pressed at 180° C. for 2 minutes and the mechanical properties measured. The sample displayed a modulus of 0.25 $MN/m^2$, and a max. stress of 0.19 $MN/m^2$ and elongation at break of 180%.

Example 70

In Example 70, Polydimethylsiloxane Diamine A, Lot 6, 5,350 molecular weight, was fed at a rate of 30.0 g/min (0.0112 equivalents amine/min) with methylenedicyclohexylene-4,4'-diisocyanate at a rate of 1.87 g/min (0.0143 equivalents isocyanate/min) into zone 1 of a Berstorff 25 mm diameter 737.5 mm length corotating twin screw extruder. Texaco Jeffamine T-5000 triamine was fed into zone 3 at a rate of 5.03 g/min (0.00302 equivalents amine/min) to provide an $NCO:NH_2$ ratio of 1.00:1.00.

Example 71

In Example 71, polydimethylsiloxane polyurea segmented copolymer was prepared as in Example 70. The diisocyanate was fed at a rate of 2.05 g/min (0.0150 equivalents NCO/min) into zone 3 to provide an $NCO:NH_2$ ratio of 1.05:1.00.

Example 72

In Example 72, polydimethylsiloxane polyurea segmented copolymer was prepared as in Example 70. The diisocyanate was fed at a rate of 2.05 g/min (0.0157 equivalents NCO/min) into zone 3 to provide an $NCO:NH_2$ ratio of 1.10:1.00.

Examples 70–72 were only partially soluble in common organic solvents, indicating high degree of branching in the resultant polymer.

The various modifications and alterations of this invention will be apparent to those skilled in the art without departing from the scope and spirit of this invention and should not be restricted to that set forth herein for illustrative purposes.

What we claim is:

1. A process for making polydiorganosiloxane polyurea segmented copolymers comprising the steps (a) continuously providing reactants to a reactor, wherein the reactants comprise at least one polyisocyanate and at least one polyamine, wherein the polyamine is at least one polydiorganosiloxane diamine or a mixture of at least one polydiorganosiloxane diamine and at least one organic polyamine,
   (b) mixing the reactants in the reactor,
   (c) allowing the reactants to react to form a polydiorganosiloxane polyurea copolymer, and
   (d) conveying the polymer from the reactor.

2. The process of claim 1 wherein the molar ratio of diisocyanate to polydiorganosiloxane diamine continuously provided to the reactor is from about 0.9:1 to 1.3:1.

3. A process of making a release film comprising the steps of:
   (a) continuously providing reactants to a reactor, wherein the reactants comprise at least one polyisocyanate and at least one polyamine, wherein the polyamine is at least one polydiorganosiloxane diamine or a mixture of at least one polydiorganosiloxane diamine and at least one organic polyamine,
   (b) mixing the reactants in the reactor,
   (c) allowing the reactants to react to form a polydiorganosiloxane polyurea copolymer,
   (d) conveying the polymer from the reactor, and
   (e) passing the polymer through a die to form a film.

4. A process of making a release film comprising the steps of:
   (a) continuously providing reactants to a reactor, wherein the reactants comprise at least one polyisocyanate and at least one polyamine, wherein the polyamine is at least one polydiorganosiloxane diamine or a mixture of at least one polydiorganosiloxane diamine and at least one organic polyamine,
   (b) mixing the reactants in the reactor,
   (c) allowing the reactants to react to form a polydiorganosiloxane polyurea copolymer, and
   (d) conveying the polymer through a die with a co-extruded second polymer to form a film.

5. A melt-processable polydiorganosiloxane polyurea segmented copolymer comprising the reaction product of (a) at least one polyamine, wherein the polyamine comprises at least one polydiorganosiloxane diamine, or a mixture of at least one polydioganosiloxane diamine and at least one organic polyamine, and (b) at least one polyisocyanate: wherein (i) the mol ratio of isocyanate:amine present during synthesis of the reaction product was between 0.9:1 and 0.95:1 or between 1.05:1 and about 1.3:1, and (ii) the copolymer is represented by the repeating unit:

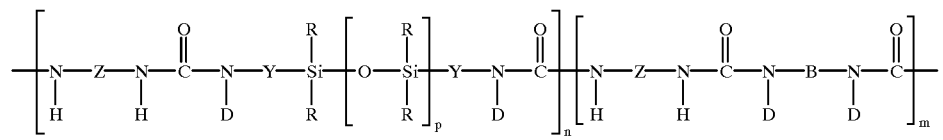

wherein:
each R is a perfluoroalkyl group or a perfluoroether-containing group;
each Z is a polyvalent radical that is (i) an arylene radical or an aralkylene radical having from about 6 to 20 carbon atoms, or (ii) an alkylene or cycloalkylene radical having from about 6 to 20 carbon atoms;
each Y is a polyvalent radical that independently is (i) an alkylene radical of 1 to 10 carbon atoms, or (ii) an aralkylene radical or an arylene radical having 6 to 20 carbon atoms;
each D is selected from the group consisting of hydrogen, an alkyl radical of 1 to 10 carbon atoms, phenyl, and a radical that completes a ring structure including B or Y to form a heterocycle;

B is a polyvalent radical selected from the group consisting of alkylene, aralkylene, cycloalkylene, phenylene, polyalkylene oxide, including copolymers and mixtures thereof, m is a number that is 0 to about 1000;

n is a number that is equal to or greater than 1; and
p is a number that is about 10 or larger.

* * * * *

UNITED STATES PATENT AND TRADEMARK OFFICE
CERTIFICATE OF CORRECTION

PATENT NO. : 6,355,759 B1
DATED : March 12, 2002
INVENTOR(S) : Sherman, Audrey A.

It is certified that error appears in the above-identified patent and that said Letters Patent is hereby corrected as shown below:

Column 1,
Line 18, "hydropnobicity" should read -- hydrophobicity --.

Column 3,
Line 36, insert -- . -- following "thereof".

Column 4,
Line 66, "0.8 dUg" should read -- 0.8 dL/g --.

Column 5,
Line 37, "," should read -- . --.
Line 45, insert -- : -- following "of".
Line 66, "diarines" should read -- diamines --.

Column 6,
Line 31, "Theological" should read -- rheological --.
Line 51, delete "Using the process of the present invention, molecular weights can be achieved such that the copolymer is essentially insoluble in common organic".

Column 7,
Line 41, insert -- . -- following "thereof"

Column 8,
Line 31, (odianisidine" should read -- (o-dianisidine --.
Line 37, "diispcyanatododecane" should read -- diisocyanatododecane --.
Line 48, "(odianisidine" should read -- (o-dianisidine --.
Line 58, "tetraniethyl" should read -- tetramethyl --.

Column 10,
Line 4, "maynot" should read -- may not --.

Column 13,
Line 12, "," should read -- . --.
Line 24, "Polydimethylsilaxane" should read -- Polydimethylsiloxane --.

UNITED STATES PATENT AND TRADEMARK OFFICE
CERTIFICATE OF CORRECTION

PATENT NO. : 6,355,759 B1
DATED : March 12, 2002
INVENTOR(S) : Sherman, Audrey A.

It is certified that error appears in the above-identified patent and that said Letters Patent is hereby corrected as shown below:

Column 14,
Line 3, "Polydimnethylsiloxane" should read -- Polydimethylsiloxane --.
Line 6, "Diamne" should read -- Diamine --.
Line 53, "Polydimethylsiloaxane" should read -- Polydimethylsiloxane --.
Line 56, "tetramethyldisoloxane" should read -- tetramethyldisiloxane -.
Line 65, "Polydiphenyldimedhylsiloxane" should read
-- Polydiphenyldimethylsiloxane --.

Column 15,
Line 12, "0.38ML" should read -- 0.38 mL --.
Line 13, "100 N/M$^2$" should read -- 100 N/m$^2$ --.

Column 16,
Line 12, "At" should read -- at --.

Column 20,
Line 2, "10-60°C.;" should read -- 10-160°C.; --.

Column 21,
Line 36, "diamineptoluene" should read -- diamine/toluene --.

Column 22,
Line 38, "ses" should read -- increases --.

Column 24,
Line 21, "orage" should read -- storage --.
Line 38, "1620." should read -- 162°. --.
Line 53, "polycarbodiimnide" should read -- polycarbodiimide --.

Column 25,
Line 36, " 1.89 dUg." should read -- 1.89 dL/g. --.

Column 28,
Line 27, "tetrahydrofuiran," should read -- tetrahydrofuran, --.
Line 61, "of0.387 g/min" should read -- of 0.387 g/min --.

Column 29,
Line 6, "34 mmn" should read -- 34 mm --.

UNITED STATES PATENT AND TRADEMARK OFFICE
CERTIFICATE OF CORRECTION

PATENT NO. : 6,355,759 B1
DATED : March 12, 2002
INVENTOR(S) : Sherman, Audrey A.

It is certified that error appears in the above-identified patent and that said Letters Patent is hereby corrected as shown below:

Column 31,
Line 5, "5280." should read -- 5280, --.
Line 30, "filly" should read -- fully --.
Line 51, "MONDUTR" should read -- MONDUR --.

Column 33,
Line 32, "duisocyanate" should read -- diisocyanate --.
Line 67, "Jeffamin™" should read -- Jeffamine™ --.

Column 34,
Line 18, "foilsample/foil" should read -- foil/sample/foil --.

Column 36,
Line 26, "95%/o);" should read -- 95%); --.

Column 37,
Line 67, "polydinethylsiloxane" should read -- polydimethylsiloxane --.

Column 40,
Line 36, "polydioganosiloxane" should read -- polydiorganosiloxane --.

Signed and Sealed this

Fifth Day of August, 2003

JAMES E. ROGAN
*Director of the United States Patent and Trademark Office*